United States Patent
Ha et al.

(10) Patent No.: US 10,444,974 B2
(45) Date of Patent: Oct. 15, 2019

(54) MOBILE TERMINAL AND CONTROL METHOD FOR CATEGORIZING INFORMATION IN A SCROLLABLE LIST

(71) Applicant: LG ELECTRONICS INC., Seoul (KR)

(72) Inventors: Yusol Ha, Seoul (KR); Yoonshinn Yang, Seoul (KR); Juha Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 426 days.

(21) Appl. No.: 15/089,057

(22) Filed: Apr. 1, 2016

(65) Prior Publication Data

US 2017/0102849 A1     Apr. 13, 2017

(30) Foreign Application Priority Data

Oct. 7, 2015    (KR) .......................... 10-2015-0141057

(51) Int. Cl.
    *G06F 3/048*      (2013.01)
    *G06F 3/0485*     (2013.01)
    *G06F 3/0484*     (2013.01)
    *G06F 3/0488*     (2013.01)
    *G06F 16/28*      (2019.01)
    *G06F 3/0482*     (2013.01)

(52) U.S. Cl.
    CPC .......... *G06F 3/0485* (2013.01); *G06F 3/0482* (2013.01); *G06F 3/04842* (2013.01); *G06F 3/04845* (2013.01); *G06F 3/04883* (2013.01); *G06F 3/04886* (2013.01); *G06F 16/287* (2019.01)

(58) Field of Classification Search
    CPC .... G06F 3/0485; G06F 3/04886; G06F 3/048; G06F 17/287
    See application file for complete search history.

(56) References Cited

U.S. PATENT DOCUMENTS

| 8,812,058 | B2 * | 8/2014 | Lee ................. | H04M 1/274525 345/173 |
| 9,176,657 | B2 * | 11/2015 | Tumwattana ......... | G06F 3/0485 |
| 2004/0019651 | A1 * | 1/2004 | Andaker ................. | H04L 51/12 709/207 |

(Continued)

FOREIGN PATENT DOCUMENTS

KR    10-2015-0012067    2/2015

OTHER PUBLICATIONS

Korean Office Action dated Sep. 30, 2016 issued in Application No. 10-2015-0141057.

*Primary Examiner* — Mahelet Shiberou
(74) *Attorney, Agent, or Firm* — KED & Associates LLP

(57) ABSTRACT

The present invention relates to a mobile terminal capable of implementing a user interface for effectively providing information, and a method for controlling the same. The mobile terminal includes a display unit capable of outputting partial information of a plurality of information, and a controller capable of scrolling the partial information, in response to a user's control command. The controller categorizes at least one of the partial information into a specific category according to a preset condition when the at least one information disappears from the display unit due to being scrolled, and outputs a graphic object corresponding to the categorized specific category.

18 Claims, 23 Drawing Sheets

(56) References Cited

U.S. PATENT DOCUMENTS

| | | | | |
|---|---|---|---|---|
| 2005/0192924 | A1* | 9/2005 | Drucker | G06F 3/0483 |
| 2010/0311445 | A1* | 12/2010 | Kim | G06F 3/0485 |
| | | | | 455/466 |
| 2011/0087981 | A1* | 4/2011 | Jeong | G06F 3/04817 |
| | | | | 715/765 |
| 2011/0231499 | A1* | 9/2011 | Stovicek | H04M 1/72547 |
| | | | | 709/206 |
| 2013/0222435 | A1* | 8/2013 | Choi | G06F 3/0482 |
| | | | | 345/684 |
| 2013/0227482 | A1* | 8/2013 | Thorsander | G06F 3/0482 |
| | | | | 715/821 |
| 2014/0129980 | A1* | 5/2014 | Lee | G06F 3/0482 |
| | | | | 715/810 |
| 2015/0113436 | A1* | 4/2015 | Penha | G06F 3/0481 |
| | | | | 715/752 |
| 2015/0193094 | A1* | 7/2015 | Armitage | G06F 17/30994 |
| | | | | 715/825 |
| 2015/0334068 | A1* | 11/2015 | Liu | G06F 17/30713 |
| | | | | 707/738 |
| 2016/0021179 | A1* | 1/2016 | James | G06F 3/04817 |
| | | | | 709/204 |
| 2016/0050168 | A1* | 2/2016 | Zutphen | H04L 51/046 |
| | | | | 715/752 |
| 2016/0098154 | A1* | 4/2016 | Ko | G06F 3/0481 |
| | | | | 345/173 |

* cited by examiner

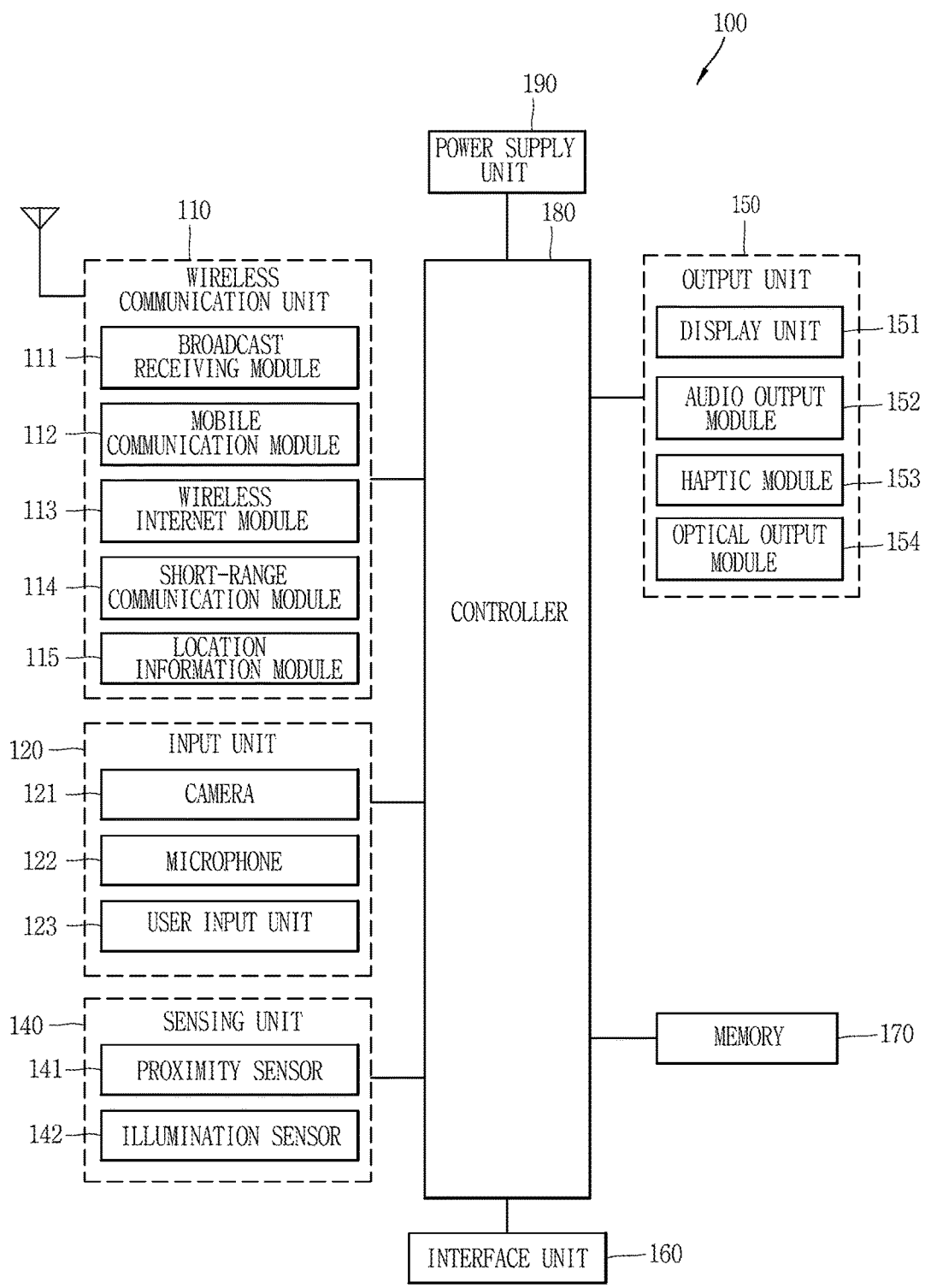

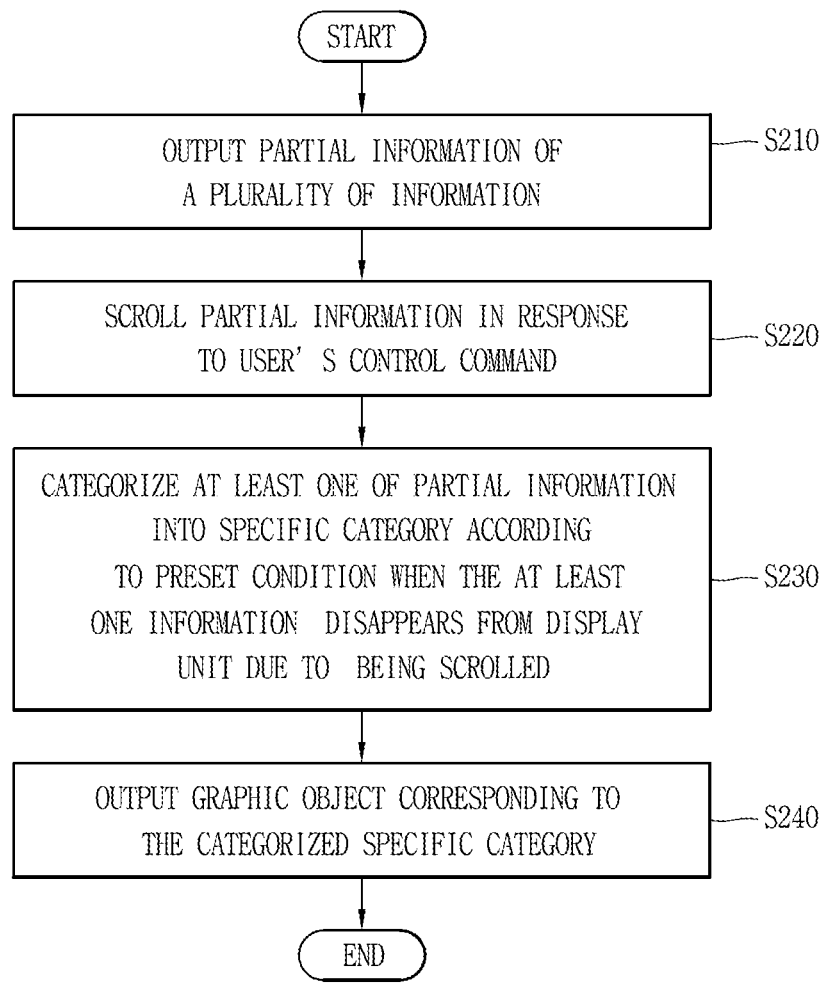

MOBILE TERMINAL AND CONTROL METHOD FOR CATEGORIZING INFORMATION IN A SCROLLABLE LIST

CROSS-REFERENCE TO RELATED APPLICATION

Pursuant to 35 U.S.C. § 119(a), this application claims the benefit of earlier filing date and right of priority to Korean Application No. 10-2015-0141057, filed on Oct. 7, 2015, the contents of which is incorporated by reference herein in its entirety.

BACKGROUND

1. Field

This specification relates to a mobile terminal capable of implementing user interfaces which effectively provide information by considering user convenience, and a method for controlling the same.

2. Background

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

As one effort of the software improvement, a mobile terminal provides a method of providing information for a user in more convenient and intuitive manners through various user interfaces.

The present invention proposes a method of providing screen information to a user in a manner of categorizing the information through interaction with a scroll of the information.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

FIG. 1A is a block diagram of a mobile terminal in accordance with the present disclosure.

FIG. 2 is a flowchart illustrating a method of controlling a mobile terminal which performs a function of categorizing screen information into categories while scrolling the screen information, in accordance with the present invention;

DETAILED DESCRIPTION OF THE INVENTION

Figure 1B:
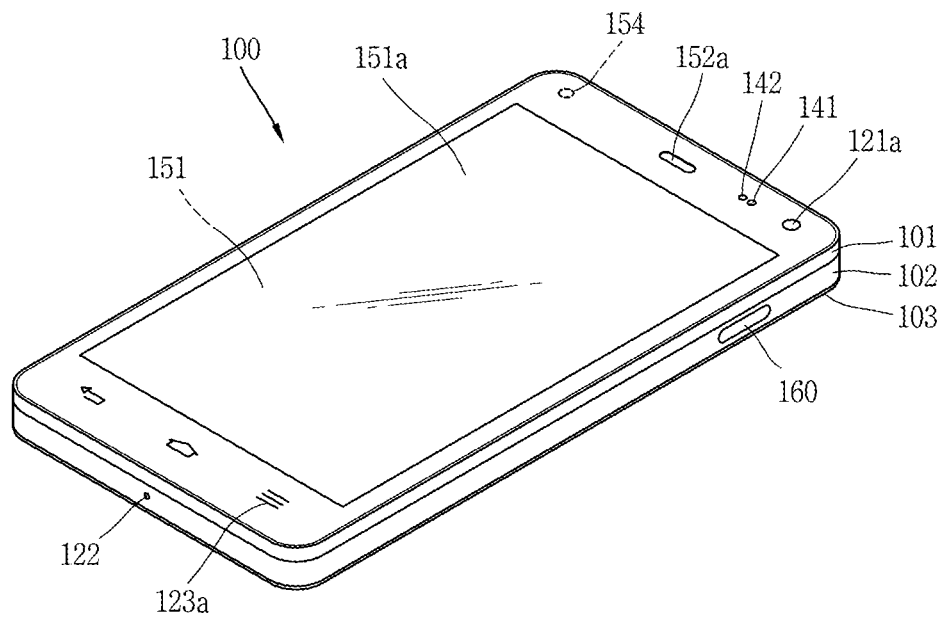
FIGS. 1B and 1C are conceptual views of one example of the mobile terminal, viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
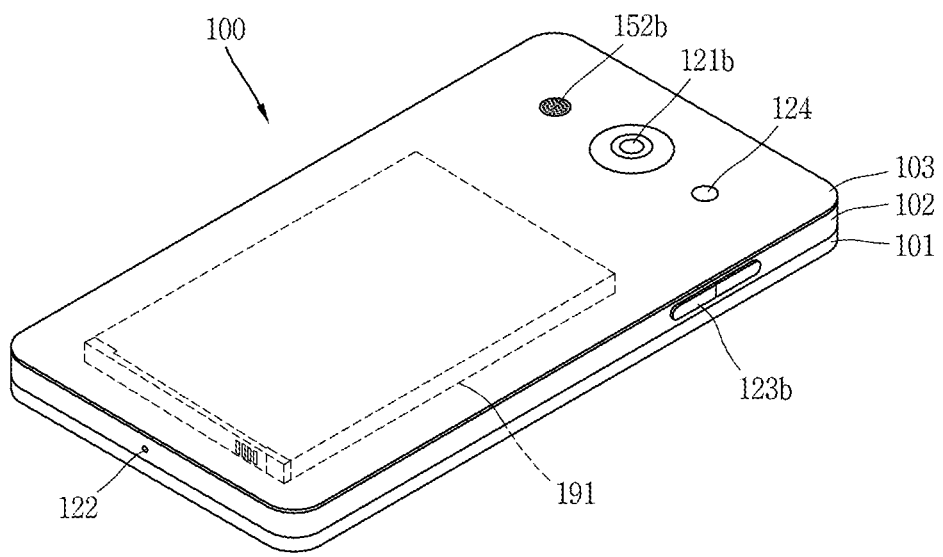

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, embodiments associated with a control method which can be implemented in the mobile terminal having such configuration will be described with reference to the accompanying drawings. It is obvious to those skilled in the art that the present disclosure can be specified into other particular forms without departing from the spirit and essential features of the present disclosure.

Also, description of the drawings will be given in a clockwise direction or from up to down, on the basis of a drawing provided on a left top.

A mobile terminal disclosed herein may provide a user interface for performing an additional function at the same time of scrolling a large amount of information. Hereinafter, a method for controlling the mobile terminal will be described in more detail.

Figure 3:
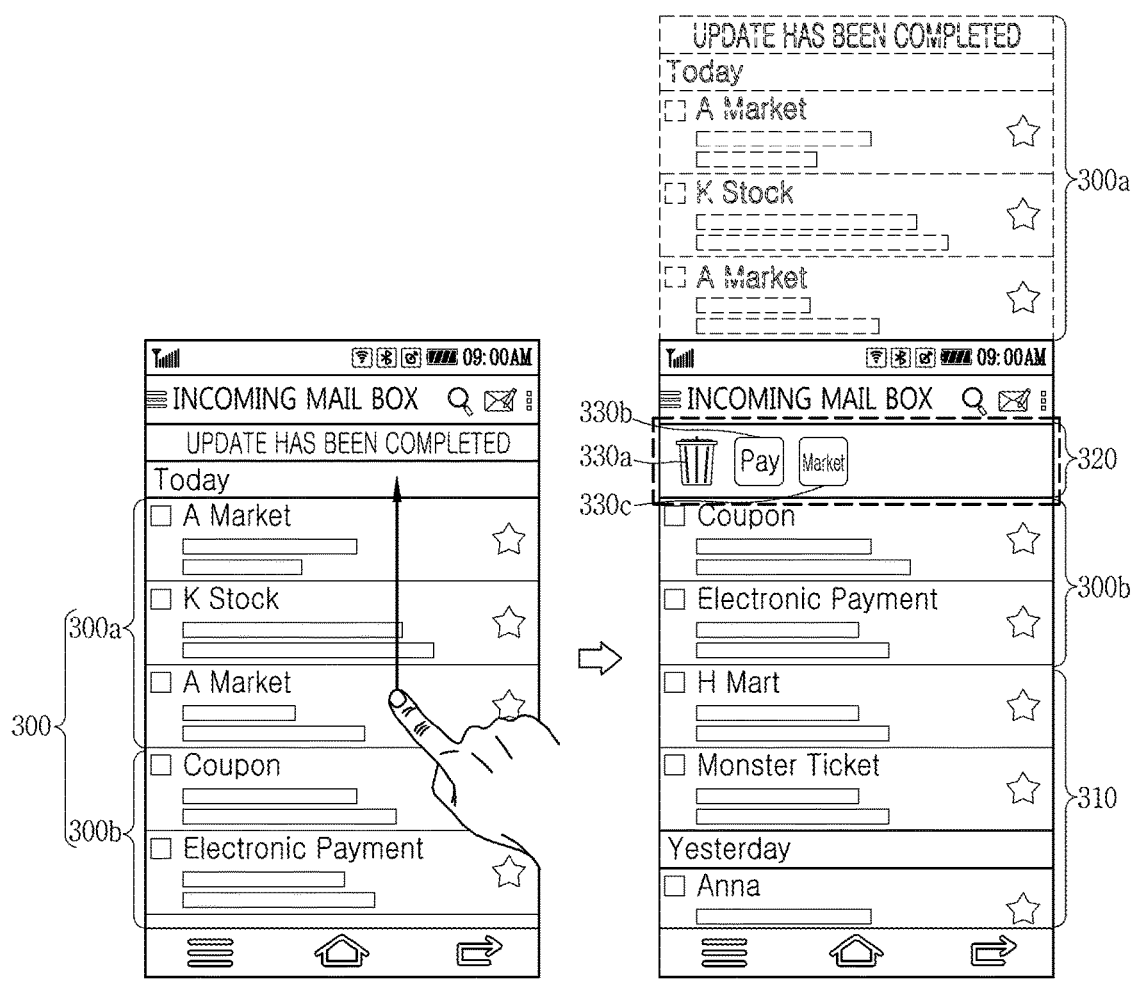
FIG. 3 is a conceptual view of the control method illustrated in FIG. 2.

FIG. 2 is a flowchart illustrating a method of controlling a mobile terminal which performs a function of categorizing screen information into categories while scrolling the screen information, in accordance with the present invention, and FIG. 3 is a conceptual view of the control method illustrated in FIG. 2.

First, a controller of a mobile terminal disclosed herein may output a part of a plurality of information on a display unit (S210).

The controller 180 of the mobile terminal disclosed herein may output on the display unit 151 a part of a plurality of information provided in the mobile terminal.

The plurality of information provided in the mobile terminal may refer to information visually outputtable on the mobile terminal, and include information related to operations of the mobile terminal, and information related to applications installed on the mobile terminal. Here, the application may be an application program which provides functions executable on the mobile terminal.

The information related to the mobile terminal may include power on/off information regarding the mobile terminal, idle screen information and the like. The information related to the applications installed on the mobile terminal may include screen information for executing an application, screen information provided upon execution of an application, or the like.

The plurality of information may be output on the display unit 151 according to a user's control command. For example, the controller 180 may output screen information, which is provided upon execution of an email application, on the display unit 151, in response to a reception of a user's control command for executing the email application.

The e-mail application may be an application program which provides a mail-related service through a mail server. In this instance, the screen information which is provided upon the execution of the email application may include a mail list including items corresponding to a plurality of mails transmitted and received to and from external terminals through the mail server, details (contents) of each mail and the like. For example, as illustrated in a first drawing of FIG. 3, a mail list may be output on the display unit 151. The mail list may include items corresponding to a plurality of mails, respectively. Accordingly, the user can enter a detail view of a mail selected from the plurality of mails by selecting an item corresponding to the e-mail.

As another example, although not illustrated, the controller 180 may output screen information, which is provided upon execution of a message application, on the display unit 151, in response to a reception of a user's control command for executing the message application. The message application may be an application program which provides a message-related service through a message server. In this instance, the screen information provided upon the execution of the message application may include a message list including items corresponding to messages transmitted and received to and from external terminals through the message server.

As another example, although not illustrated, the controller 180 may output screen information, which is provided upon execution of a gallery application (or a photo application), on the display unit 151, in response to a reception of a user's control command for executing the gallery application. The gallery application may be an application program which provides images (including still images and videos) stored in the mobile terminal or external servers. In this instance, the screen information provided upon the execution of the message application may include an image list including items corresponding to a plurality of images stored in a memory of the mobile terminal.

The following description will be given of mails as an embodiment of a plurality of information. However, the present invention may not be limited to this, and may also be applicable to messages, images, information included on web pages, and the like. The mail may also be used as the same meaning as the term such as an electronic mail or email.

Meanwhile, the controller 180 may output a part of a plurality of information on the display unit 151 when an amount (or digits) or information content of the plurality of information is greater than an amount of information which is outputtable on one screen of the display unit 151. In this instance, the other information, except for the partial information output on the display unit 151, of the plurality of information may not be output on the display unit 151. For example, as illustrated in a first drawing of FIG. 3, when the plurality of information are items corresponding to a plurality of mails, respectively, the controller 180 may output on the display unit 151 items 300 corresponding to a part of the plurality of mails, of the items corresponding to the plurality of mails, respectively. In this instance, the other items 310 except for the items 300 corresponding to the part of the plurality of mails may not be output on the display unit 151.

While the part (i.e., partial information or some information) of the plurality of information is output, the controller of the mobile terminal may scroll the partial information, in response to a user's control command (S220).

The controller 180 may scroll the partial information when a user's control command for scrolling the partial information is received.

Here, the term "scrolling information" refers to an operation of the mobile terminal of moving screen information output on the display unit 151 up and down or from left to right. The operation of the mobile terminal may be interpreted as the same meaning as the term "moving information."

In more detail, "scrolling information" may include "vertical scroll" which is an operation of the mobile terminal of moving information up and down, and "horizontal scroll" which is an operation of the mobile terminal of moving information from left to right. Also, "scrolling information" may include "scroll up" which is an operation of the mobile terminal of moving information upward, and "scroll down" which is an operation of the mobile terminal of moving information downward.

Hereinafter, scrolling in all directions (up, down, left, right) will be described as the term "scrolling information," and a scroll in a specific direction will be described using those terms "vertical scroll," "horizontal scroll," "scroll up," and "scroll down."

The user's control command for controlling the partial information may be input through a scroll key provided on the mobile terminal, through a touch input applied to the display unit 151, or through a camera 121.

For example, the user's control command for scrolling the partial information may be input through a scroll button or a wheel button provided on the mobile terminal. As another example, the user's control command for scrolling the partial information may be input through a drag input applied to the display unit 151. As another example, the user's control command for scrolling the partial information may be input as a control command corresponding to information related to user's eyes (or eye) detected by the camera 121.

The controller 180 may control at least one of the partial information to disappear from the display unit 151, upon scrolling the partial information in response to the user's control command for scrolling the partial information.

The at least one information disappeared from the display unit 151 may be decided by a scroll direction. That is, the controller 180 may control the at least one information, which is located in a direction that the partial information is scrolled, to disappear from the display unit 151.

For example, as illustrated in a first drawing of FIG. 3, upon execution of an email application, the controller 180 may output screen information provided in relation to the email application on the display unit 151. In more detail, the controller 180 may output on the display unit 151 items 300 corresponding to a part (i.e., partial mail(s)) of a plurality of mails on a mail list, which includes items corresponding to the plurality of mails, respectively.

In this instance, as illustrated in a second drawing of FIG. 3, the controller 180 may scroll in an upward direction (or scroll up) the items 300 corresponding to the part of the plurality of mails (i.e., partial mails), in response to a drag input in a first direction that is applied from down to up. In this instance, the controller 180 may control an item 300*a* corresponding to at least one mail output on an upper side of the display unit 151, of the items 300 corresponding to the partial mails, to disappear from the display unit 151. Also, the controller 180 may change output positions of items 300*b* corresponding to the other mails, except for the item 300*a* corresponding to the at least one mail, of the items 300 corresponding to the part mails.

Also, when the at least one information disappears due to being scrolled, the controller 180 may output on the display unit 151 new information, which has not been output prior to the scroll, of the plurality of information. The new information may be as much as an amount of the disappeared at least one information.

The new information may be located at an opposite direction to the information-scrolled direction. As illustrated in the second drawing of FIG. 3, when the items 300 corresponding to the partial mails are scrolled up, the controller 180 may output on a lower end of the display unit 151 items 310 corresponding to new mails, different from the items 300 corresponding to the partial mails, of the plurality of mails.

When the at least one of the partial information disappears from the display unit 151 in response to the information being scrolled, the controller 180 may categorize the disappeared at least one information into a specific category based on a preset condition (S230).

When the information output on the display unit 151 is scrolled, the controller 180 may categorize one or more of the at least one information, disappeared from the display unit 151 due to being scrolled, into a specific category, and provide the specific category for the user.

That is, the controller 180 may allow for categorizing information disappeared due to being scrolled into a specific category at the same time of scrolling the information. In this specification, this function is referred to as "categorization scroll function" for the sake of explanation. Also, to distinguish the categorization scroll function from a conventional function of scrolling information, the function of merely scrolling information is referred to as "general scroll function." These terms may be easily changed by those skilled in the art.

Target information to be categorized into the specific category may be all of the at least one information disappeared from the display unit 151, or only information without reception (or check) acknowledgement information, of the at least one information disappeared from the display unit 151.

Here, the reception acknowledgement information may be information indicating whether or not a user has read (checked) information. For example, the reception acknowledgement information may have a value of 0 when the user has not read information, or a value of 1 when the user has read the information.

Or, the target information to be categorized into the specific category may be information selected by the user.

Hereinafter, description will be given of a case where all of the at least one information disappeared from the display unit corresponds to the target information, but the present invention may alternatively be applied to a case where only information with reception acknowledgement information of the disappeared information from the display unit 151 is set as the target information.

The method of categorizing the information into the specific category will be described in more detail. When several (partial) information, output on the display unit 151, of a plurality of information are scrolled, the controller 180 may detect at least one information disappeared from the display unit 151 due to being scrolled. The controller 180 may categorize the at least one information disappeared due to being scrolled into a specific category based on a preset condition (or reference).

Here, the category is a group of information satisfying preset conditions. The term 'category' may be replaceable with other terms such as 'folder' or 'group.'

The preset condition may be a condition that is associated with at least one of details (contents) of information output on the display unit 151, identification information included in the information and importance of the information. For example, the preset condition may be a condition that an originator (sender) of a mail is a preset originator, a condition that a specific word is included in details of a mail, a condition that information is related to another application which is currently executed, a condition that an originator is one of favorite originators preset, a condition that an originator is one stored in a memory, and the like.

The controller 180 may categorize the at least one information disappeared from the display unit 151 into at least one category based on a preset condition.

The controller 180 may categorize pieces of information which do not satisfy the preset condition into a delete category. The delete category may be a group of target information to be deleted. Here, the deletion is an operation of the mobile terminal of deleting (or removing) information from a memory (or a storage medium) of the mobile terminal or an external server. Also, the target information to be deleted may refer to information to be deleted from a memory. That is, the controller 180 may determine mails without meeting a preset condition as unnecessary information, and set those mails as the target information to be deleted for deleting the unnecessary mails.

For example, for a mail whose originator does not correspond to a preset originator, the controller 180 may categorize the mail into the delete category. That is, the controller 180 may determine a mail as an unnecessary mail when an originator of the mail does not correspond to a preset originator, set the mail as a target mail to be deleted, and categorize the mail into the delete category.

Meanwhile, the controller 180 may execute one of a general scroll function and a categorization scroll function according to a user's control command. The user's control command will be described in more detail later with reference to FIGS. 4A to 5B.

When the at least one of the partial information is categorized into the specific category, the controller of the mobile terminal disclosed herein may output a graphic object indicating the categorized specific category on the display unit (S240).

When the at least one information, disappeared from the display unit 151 due to being scrolled, of the partial information output on the display unit 151, is categorized into the specific category, the controller 180 may output a graphic object indicating the specific category on the display unit 151.

Meanwhile, to output the graphic object indicating the specific category, the controller 180 may set a category area for outputting the graphic object indicating the specific category on the display unit 151. The category area may output thereon graphic objects indicating specific categories, respectively. For example, as illustrated in the second drawing of FIG. 3, the controller 180 may set the category area for outputting graphic objects indicating specific categories on an upper area of the display unit 151.

The category area may also be located at an upper end of the display unit 151 at any time, irrespective of an information-scrolled direction.

On the other hand, the category area may be set by the user or decided by an information-scrolled direction. For example, when information is scrolled up based on a front surface of the display unit 151, the category area may be located at an upper end of the display unit 151. When information is scrolled down based on the front surface of the display unit 151, the category area may be located at a lower end of the display unit 151. Also, when information is scrolled to left based on the front surface of the display unit 151, the category area may be located at a left side of the display unit 151. When information is scrolled to right based on the front surface of the display unit 151, the category area may be located at a right side of the display unit 151.

Whether or not to change the location of the category area according to the scroll direction may depend on a setting of the mobile terminal. The setting may be changeable by the user. Hereinafter, description will be given of the method for controlling the mobile terminal under assumption that the category area is always located at the upper end of the display unit, irrespective of the scroll direction, but a similar control method may also be applied to a case where the category area is changed according to the scroll direction.

The category area may output thereon graphic objects indicating specific categories, respectively. For example, as illustrated in the second drawing of FIG. 3, when the items 300 corresponding to the partial mails output on the display unit 151 are scrolled up, at least one mail (three mails in the drawing) disappeared from the display unit 151 due to being scrolled may be categorized into three categories. The three categories may include a category including mails to be deleted, a category including mails received from a first originator, and a category including mails received from a second originator.

The controller 180 may output graphic objects 330a, 330b and 330c indicating the three categories, respectively, on a category area 320. The controller 180 may also output a number of information pieces belonging to each category in the vicinity of the graphic object indicating each category.

When there is information with notification information related to an event generated therein, among information categorized in a specific category, the controller 180 may change a visual appearance of a graphic object indicating the specific category, to which the information with the notification information related to the event belongs. Therefore, the user can recognize that the event has been generated from the information belonging to the specific category.

The controller 180 may also selectively provide only information belonging to a specific category by using a graphic object indicating the specific category. In more detail, the controller 180 may output only information belonging to a specific category on the display unit 151, in response to a touch applied to a graphic object indicating the specific category. Therefore, the user can automatically categorize information and check or view the categorized information at once, even without a separate control command for grouping.

The controller 180 may control information belonging to a specific category, using a graphic object indicating the specific category. For example, the controller 180 may change a category of information belonging to a specific category or delete the information belonging to the specific category, by using a graphic object indicating the specific category. Therefore, the user can execute an edition for such automatically-categorized category.

Meanwhile, after the at least one information disappeared from the display unit 151 is categorized into the specific category, the controller 180 may release the categorization of (decategorize) the disappeared information, which has been categorized into the specific category, in response to a user's control command applied to output the disappeared information again. Here, when an input for scrolling information is a drag input applied in a first direction, the user's control command for outputting the disappeared at least one information again may be a drag input applied in a second direction opposite to the first direction.

For example, after the at least one information disappears in response to the drag input applied in the first direction, when the drag input is applied in the second direction opposite to the first direction, the controller 1809 may output the disappeared at least one information again. In this instance, the controller 180 may decategorize the at least one information.

Or, when a preset touch input is applied to the graphic object indicating the specific category, the controller 180 may decategorize the information categorized in the specific category. In this instance, the user can selectively categorize information included in a desired specific category among a plurality of categories.

When the information categorized in the specific category is decategorized, the graphic object indicating the specific category may not be output on the display unit 151 anymore. Also, the decategorized information from the specific category may be output on the display unit 151 again. That is, the controller 180 may not output the graphic object indicating the specific category any more when the at least one information disappeared from the display unit 151 is output on the display 151 again.

Meanwhile, the foregoing description has given of a method of categorizing every information disappeared from the display unit 151. On the other hand, the present invention may categorize information, which has not been checked by the user, among information disappeared from the display unit 151. That is, the controller 180 may not categorize information which has been read or checked by the user into a specific category, even though the information disappears from the display unit 151 due to being scrolled.

Accordingly, the user may not be provided with separate notification information related to information, which the user has already read (or checked) and recognized, of scrolled information. Therefore, unnecessary information cannot be provided to the user.

The foregoing description has been given of a method of providing information disappeared from the display unit due to being scrolled, in a categorizing manner, while information output on the display unit is scrolled. The user may accordingly scroll information and simultaneously categorize the disappeared information due to the scroll, so as to be provided with details of the disappeared information. Also, the user can categorize information while scrolling the information, which may allow the user to perform categorization while checking details of information to be categorized.

Figure 4A:
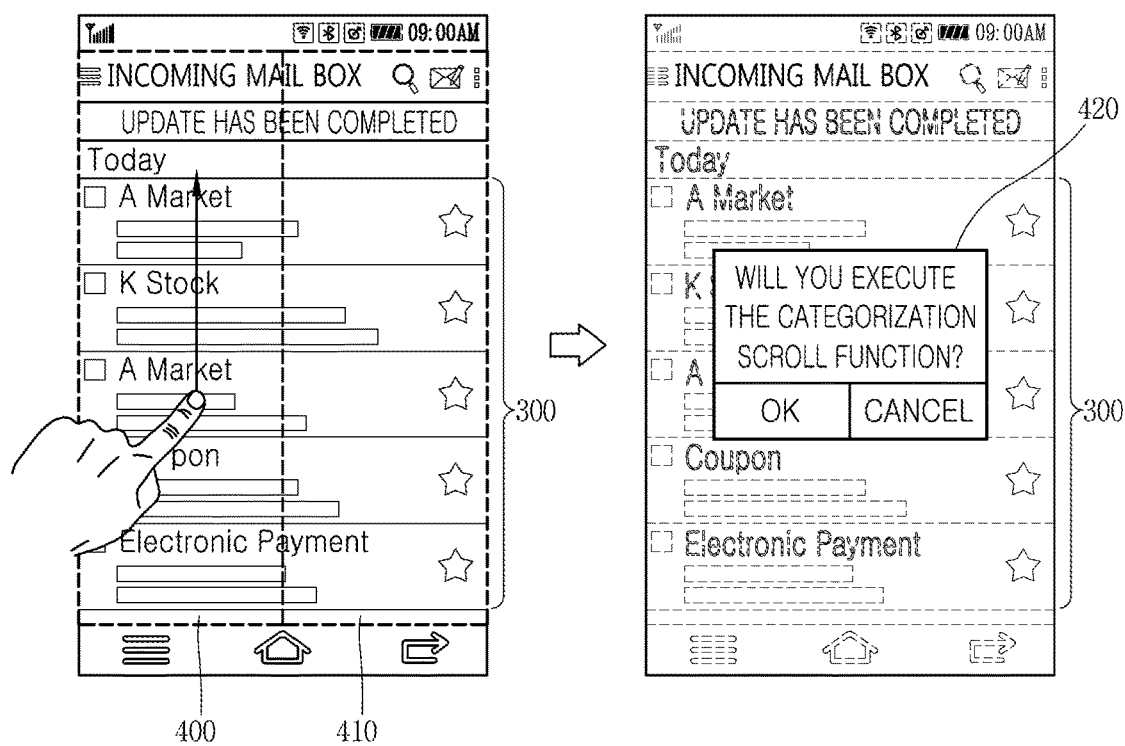
FIGS. 4A, 4B and 4C are conceptual views illustrating a method of executing a function of categorizing information disappeared from a display unit due to being scrolled, while scrolling the information.
Figure 4B:
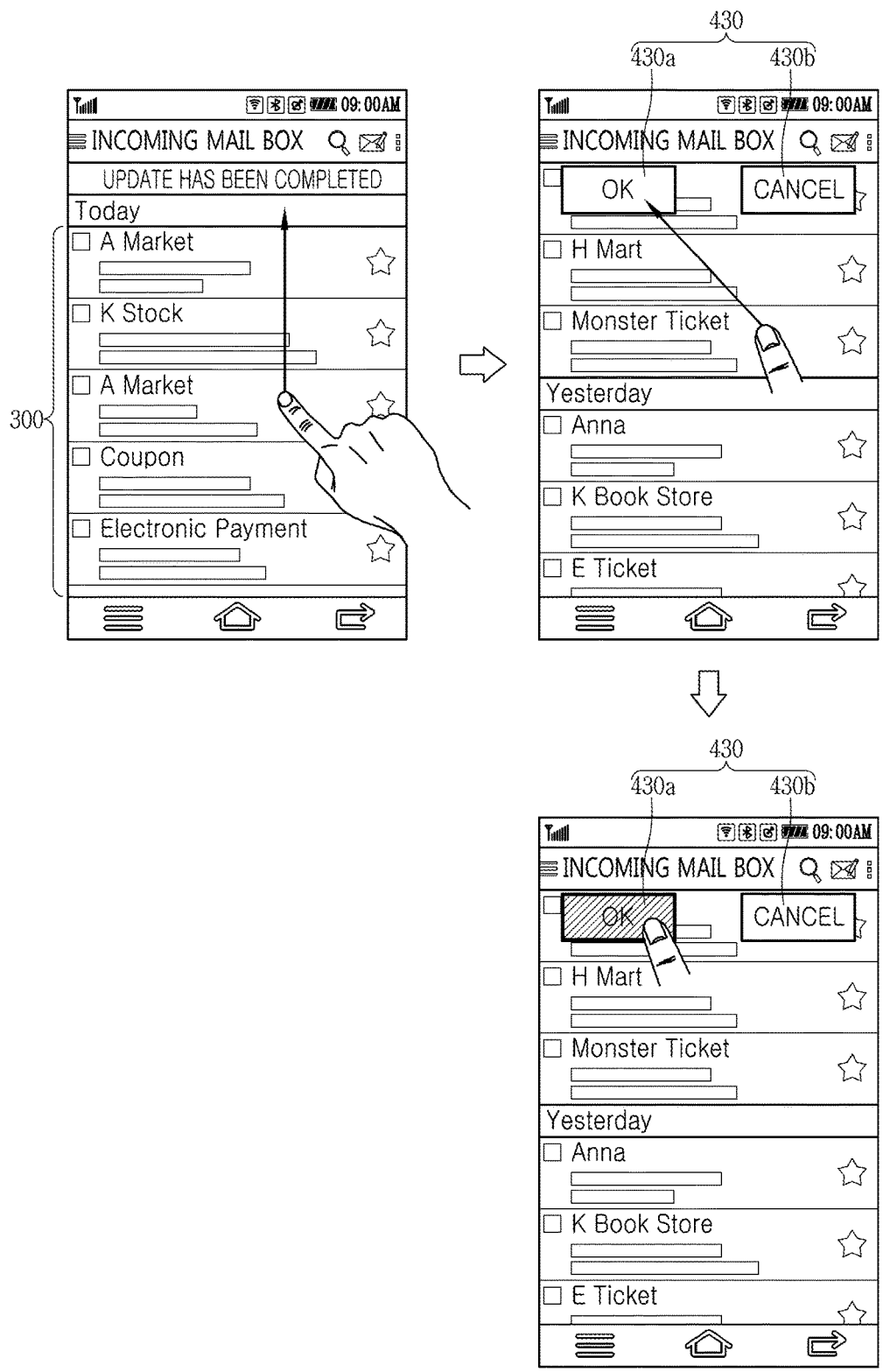
Figure 4C:
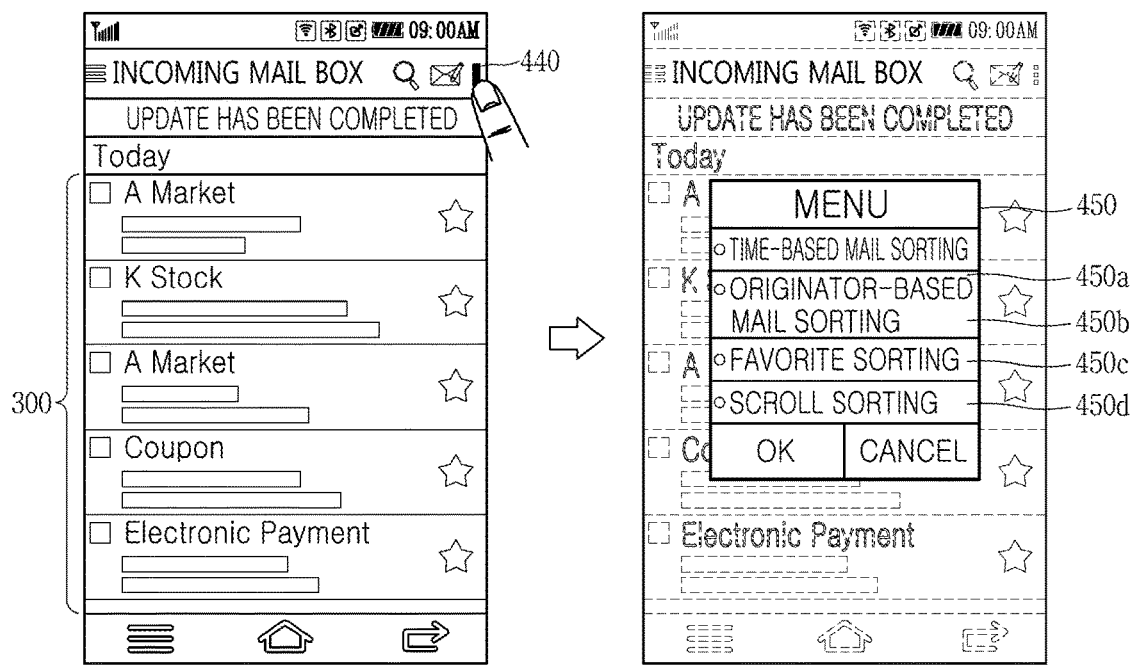

Hereinafter, description will be given of a method of executing a function of categorizing information disappeared from a display unit due to being scrolled at the same time of scrolling the information. FIGS. 4A, 4B and 4C are conceptual views illustrating a method of executing a function of categorizing pieces of information disappeared from a display unit due to being scrolled, while scrolling the information.

When a user's control command for scrolling information output on the display unit 151 is applied, the controller 180 may execute one of a general scroll function and a categorization scroll function.

When the general scroll function is currently executed, the controller 180 may scroll information, in response to the user's control command applied to scroll the information output on the display unit 151.

On the other hand, when the categorization scroll function is currently executed, the controller 180 may simultaneously execute information scroll and information categorization into a category, in response to the user's control command applied to scroll the information output on the display unit 151.

Meanwhile, the controller 189 may execute the general scroll function when the categorization scroll function is not executed.

Accordingly, the user of the present invention can apply a control command for executing the categorization scroll function. The user's control command for executing the categorization scroll function may be applied in various manners.

For example, the controller 180 may output a popup window for inquiring whether or not to execute the categorization scroll function on the display unit 151. That is, as illustrated in FIG. 4A, the controller 180 may output a popup window 420 for inquiring whether or not to execute the categorization scroll function, in response to a drag input applied in a preset direction to a specific area 400 on the display unit 151.

The user may select execution or non-execution of the categorization scroll function through the popup window 420 inquiring whether or not to execute the categorization scroll function. If the user selects the execution of the categorization scroll function, the controller 180 may scroll information and simultaneously categorize information disappeared due to being scrolled, in response to the user's control command for scrolling the information. On the other hand, when the user does not select the execution of the categorization scroll function, the controller 180 may merely scroll the information, in response to the user's control command for scrolling the information.

As another example, as illustrated in a first drawing of FIG. 4B, when a drag input is applied by a preset length or more to the display unit 151, the controller 180 may output a graphic object 430 for executing the categorization scroll function.

The graphic object 430 for executing the categorization scroll function may be output at a position corresponding to an applied direction of the drag input. As illustrated in a second drawing of FIG. 4B, the controller 180 may output the graphic object 430 for executing the categorization scroll function on an upper end of the display unit 151, in response to a drag input applied from down to up. Therefore, the user can select execution or non-execution of the categorization scroll function by applying a touch continuous to the drag input.

The graphic object 430 for executing the categorization scroll function may include a first object 430a associated with the execution (e.g., OK or Yes) of the categorization scroll function, and a second object 430b associated with the non-execution (e.g., Cancel or No) of the categorization scroll function.

In this instance, as illustrated in a third drawing of FIG. 4B, the controller 180 may execute the categorization scroll function, in response to a touch continuous to the drag input being applied to the first object 430*a*.

Although not illustrated, the controller 180 may not execute the categorization scroll function, in response to a touch continuous to the drag input being applied to the second object 430*b*.

As another example, as illustrated in a first drawing of FIG. 4C, when a touch is applied to an icon 440 which is associated with an item corresponding to at least one mail and mail setting menus.

As illustrated in a second drawing of FIG. 4C, the setting menus may include a time-based mail categorizing (sorting) menu 450*a*, an originator-based mail categorizing item 450*b*, a favorite-based categorizing item 450*c*, and a scroll categorizing item 450*d*.

In this instance, the user can execute the categorization scroll function by selecting the scroll categorizing item 450*d*.

The foregoing description has been given of a method of executing a function of categorizing disappeared information due to being scrolled at the same of scrolling information output on the display unit. This may allow for executing the general scroll function and the categorization scroll function according to the user's request.

Hereinafter, description will be given of a method of executing a categorization scroll function according to an area to which a drag input is applied. FIGS. 5A to 6B are conceptual views illustrating a method of executing a categorization scroll function according to an area to which a drag input is applied.

The controller 180 of the mobile terminal disclosed herein may scroll information output on the display unit 151, in response to a drag input applied to the display unit 151.

In this instance, the controller 180 may execute a different function according to an area to which the drag input is applied. That is, the controller 180 may execute one of the general scroll function and the categorization scroll function according to the area to which the drag input is applied.

To this end, the controller 180 may divide the display unit 151 into a plurality of areas. For example, as illustrated in a first drawing of FIG. 5A, the controller 180 may divide the display unit 151 into a first area 500 and a second area 510.

The controller 180 may then execute one of the general scroll function and the categorization scroll function according to one of the first area 500 and the second area 510, to which the drag input is applied.

Figure 5A:
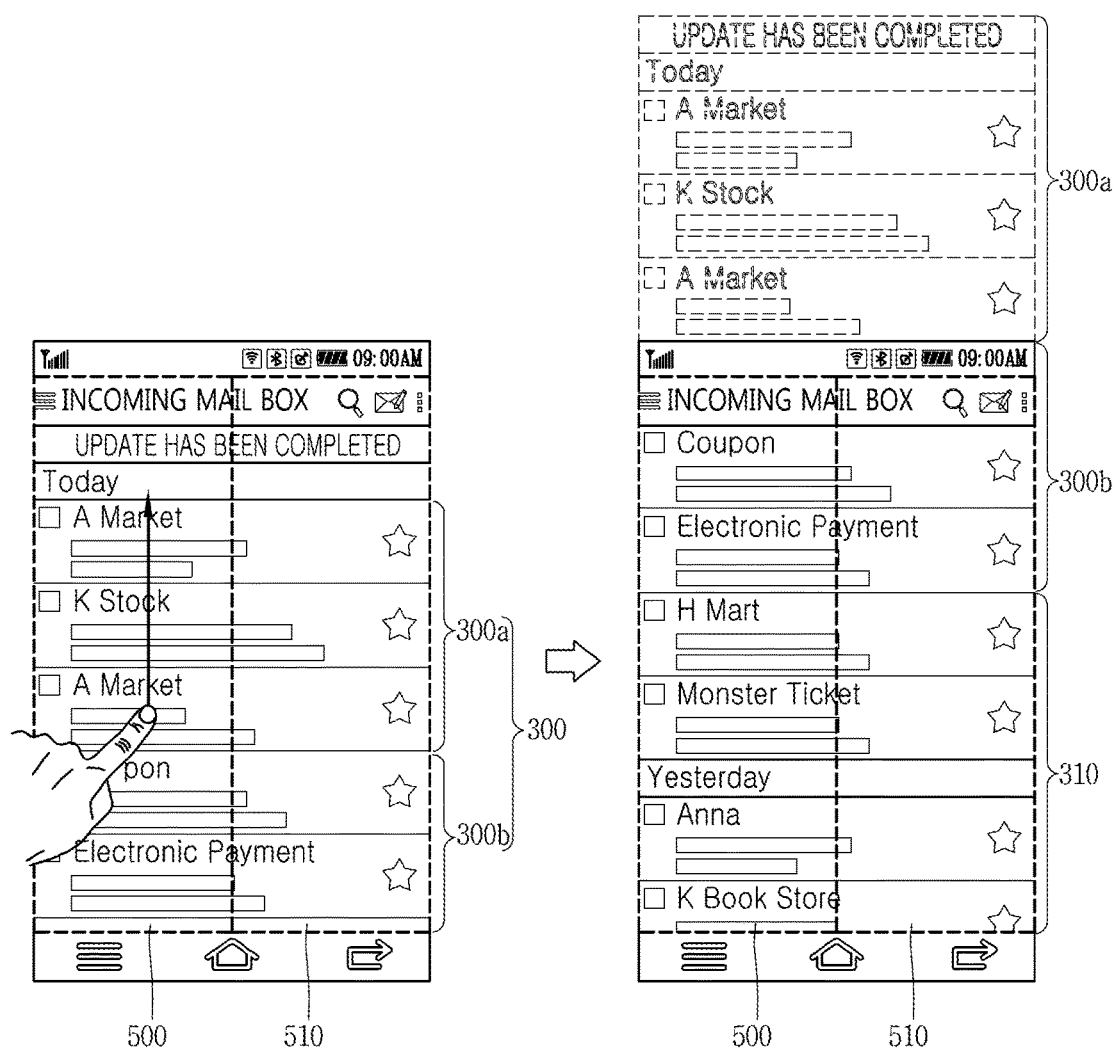
FIGS. 5A to 6B are conceptual views illustrating a method of executing a categorization scroll function according to an area to which a drag input is applied.

For example, as illustrated in the first drawing of FIG. 5A, the controller 180 may execute the general scroll function, in response to a drag input applied to the first area 500.

As illustrated in a second drawing of FIG. 5A, when the general scroll function is executed, several items 300*a* of items 300 corresponding to at least one mail, which has been output on the display unit 151 prior to the scroll, may disappear from the display unit 151. Simultaneously, items 310 corresponding to new mails which have not been output prior to the scroll may appear on the display unit 151.

Figure 5B:
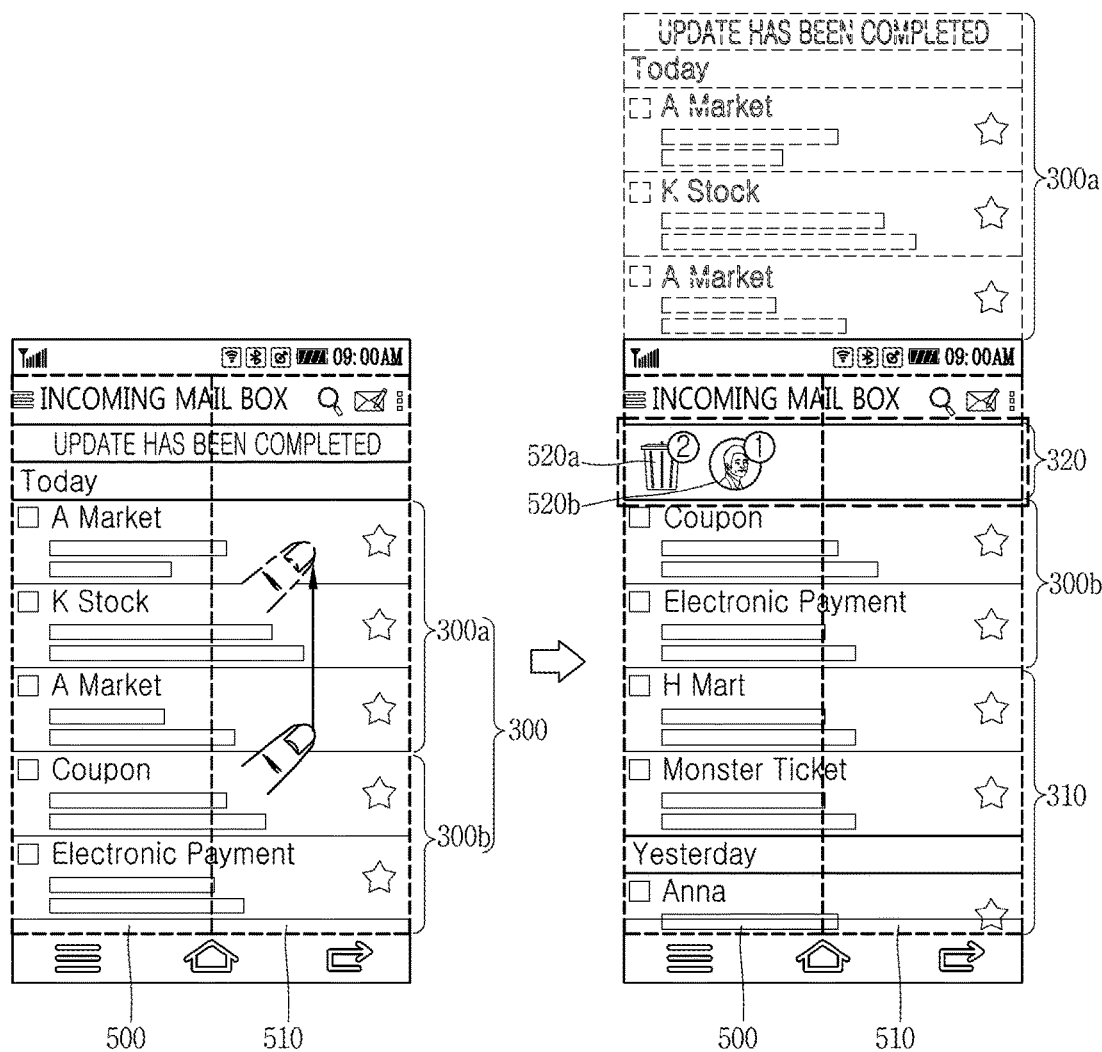

On the other hand, as illustrated in a first drawing of FIG. 5B, the controller 180 may execute the categorization scroll function, in response to a drag input applied to the second area 510. When the categorization scroll function is executed, the controller 180 may scroll information and simultaneously categorize at least part of the information, which disappears due to being scrolled, into categories. The controller 180 may then output a category area 320 on which graphic objects indicating the categorized categories are output.

As illustrated in a second drawing of FIG. 5B, the controller 180 may categorize the several items 300*a*, which have disappeared from the display unit 151, into two categories, based on a preset condition or reference. In this instance, the category area 320 may output thereon graphic objects 520*a* and 520*b* indicating the two categories, respectively.

Although not illustrated, when the areas of the display unit 151 are linked to the general scroll function and the categorization scroll function, respectively, the controller 180 may provide guide information for the user. The guide information may be an image indicating the divided areas of the display unit 151. Therefore, the user can recognize that the display unit 151 is divided into areas and each area is linked to a different function.

The foregoing description has been given of a method of performing the general scroll function and the categorization scroll function according to an area with a drag input applied thereto.

On the other hand, the controller 180 may link a function of categorizing information into specific categories to a plurality of areas divided.

In more detail, the controller 180 may perform the categorization scroll function, in response to a drag input applied to a first area 600 and a second area 610. In this instance, the controller 180 may set a category in which information is categorized according to an area to which a drag input is applied.

Figure 6A:
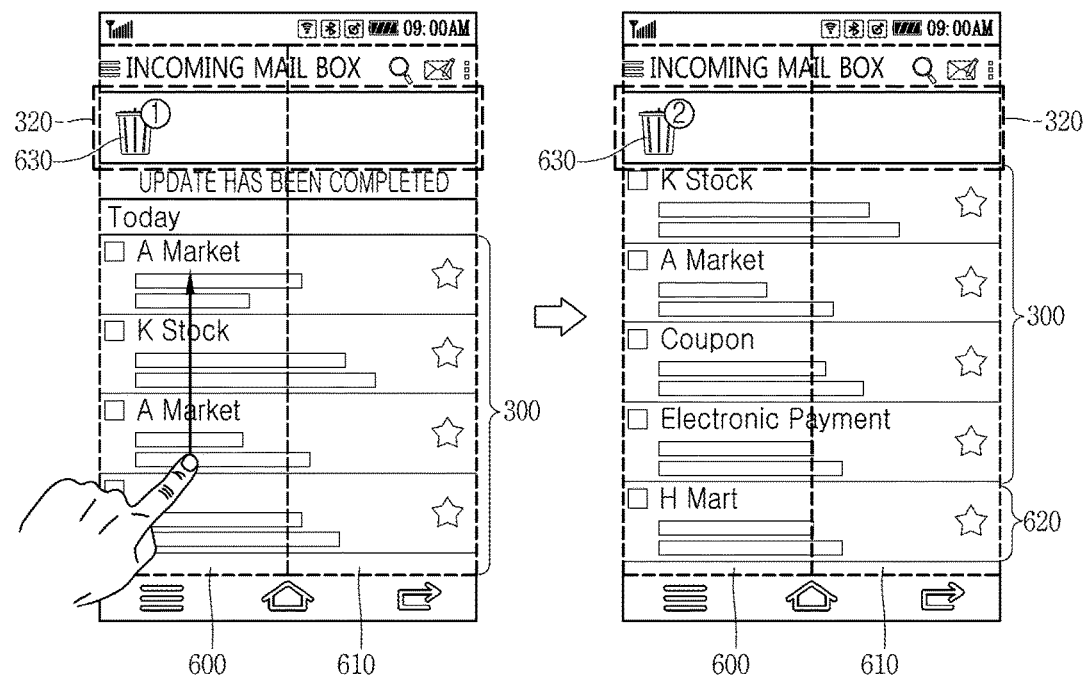

For example, as illustrated in a first drawing of FIG. 6A, when a drag input is applied to the first area 600, the controller 180 may categorize information into a delete category. That is, the controller 180 may set at least one information, which has disappeared from the display unit 151 due to being scrolled, as information to be deleted.

Also, as illustrated in a second drawing of FIG. 6A, when the information is categorized into the delete category, the display unit 151 may output a number of information included in the delete category on a graphic object 630 indicating the delete category. Simultaneous to this, an item 620 corresponding to a new mail which has not been output before the scroll may be output on the display unit 151.

Figure 6B:
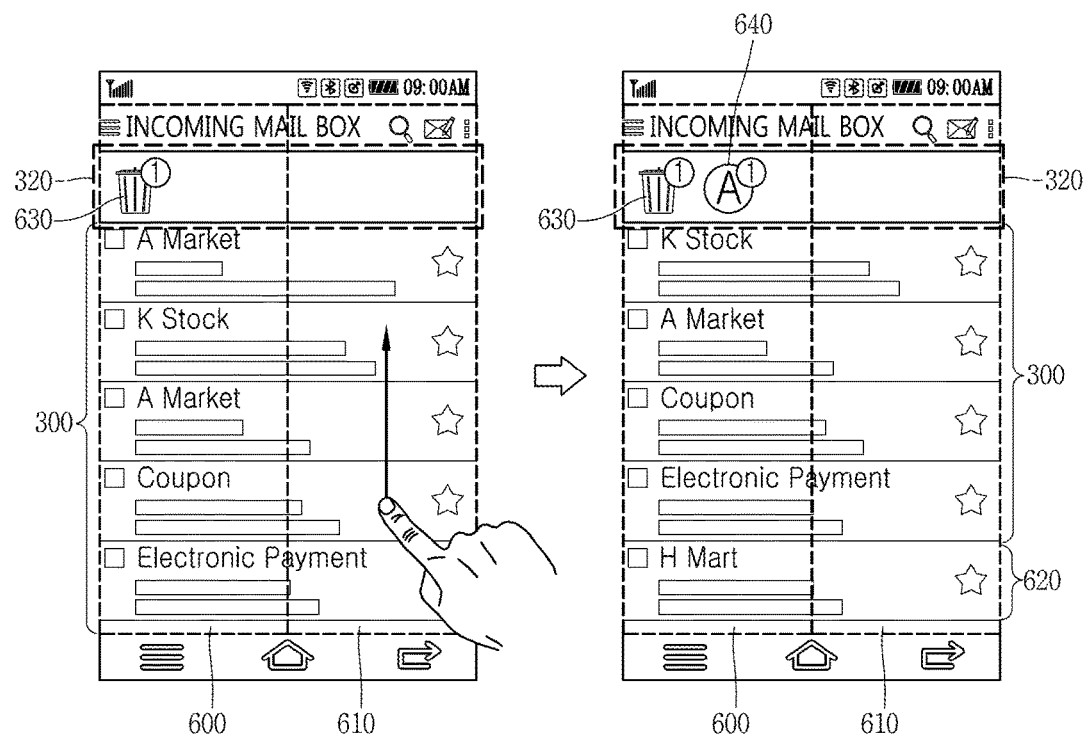

As another example, as illustrated in first and second drawings of FIG. 6B, when a drag input is applied to the second area 610, the controller 180 may categorize information based on originators of mails. When the information is categorized based on the originator of the mail, the controller 180 may output a graphic object 640, which indicates a category including mails received from a specific originator, on the category area 320. Therefore, the user can conveniently set a category to which information is to be categorized.

Meanwhile, the foregoing description has been given of embodiments of executing different functions with respect to a plurality of area divided, respectively. Those embodiments may be independent of each other, and a function linked to each area may be set by the user, or preset at the time of factory shipment of the mobile terminal.

So far, a method of dividing the display unit into a plurality of areas and performing a different function according to an input applied to each of the plurality of areas has been described.

This may facilitate the user to execute various functions based on a touch-applied area.

Figure 7A:
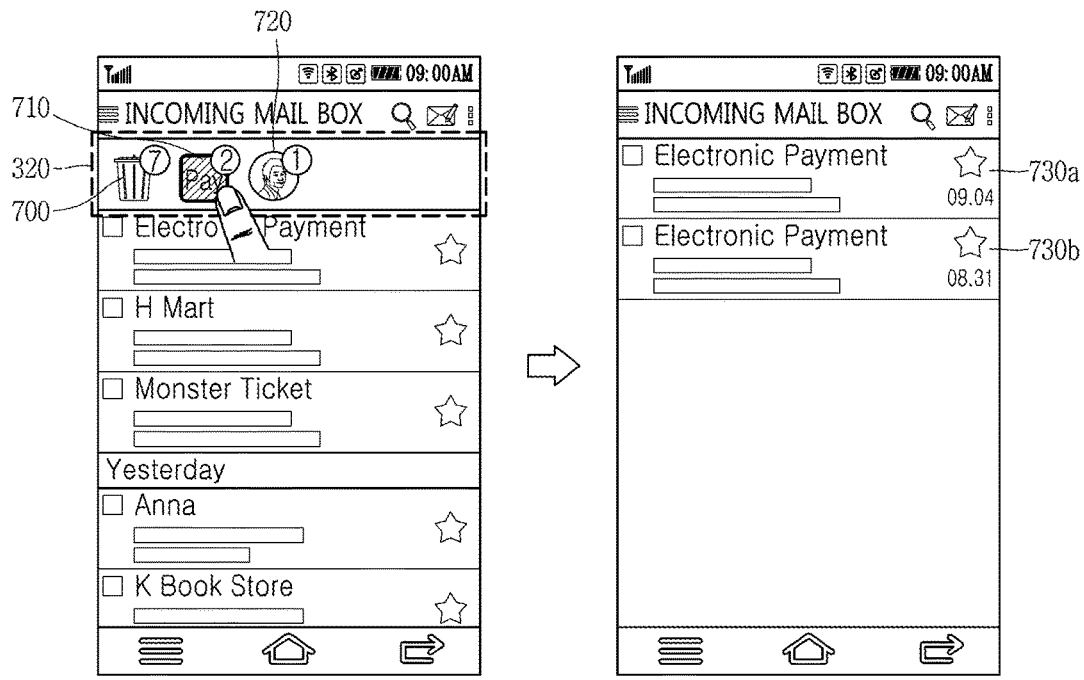
FIGS. 7A and 7B are conceptual views illustrating a method of outputting information belonging to a category using a graphic object indicating the category.
Figure 7B:
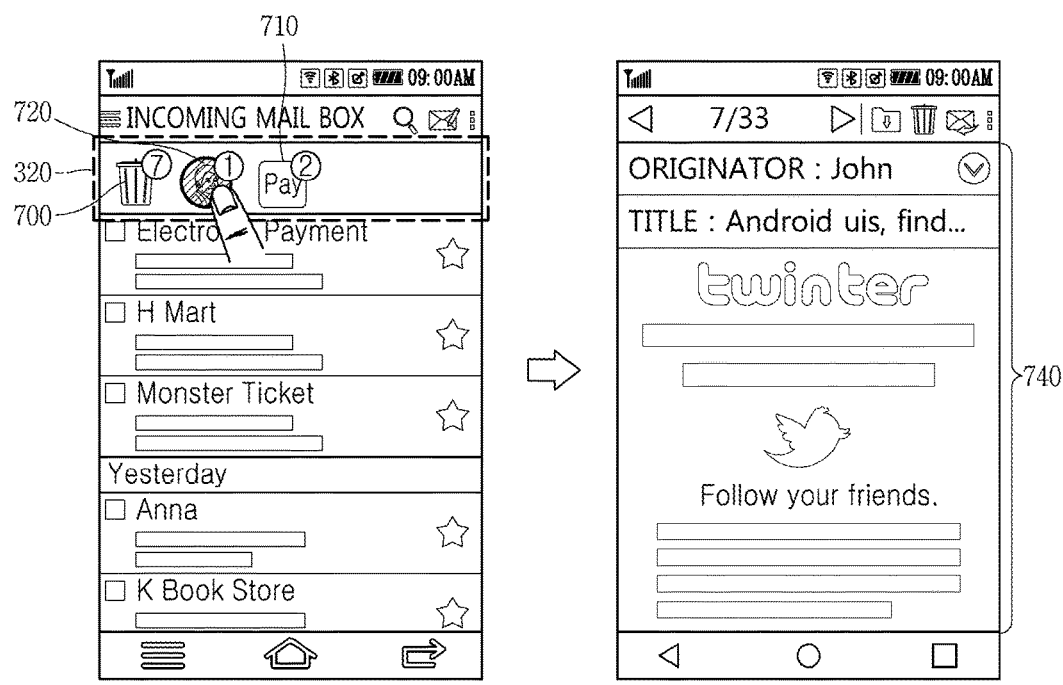

Hereinafter, description will be given of a method of outputting information belonging to a category using a graphic object indicating the category. FIGS. 7A and 7B are conceptual views illustrating a method of outputting information belonging to a category using a graphic object indicating the category.

When some pieces of information are categorized into a plurality of categories by the categorization scroll function, the controller 180 may output graphic objects indicating the plurality of categories, respectively, on the category area 320. Also, a number of information belonging to each category may be indicated on the graphic object indicating each of the plurality of categories. For example, as illustrated in a first drawing of FIG. 7A, the controller 180 may output graphic objects 700, 710, and 720 indicating the plurality of categories, respectively, on the category area 320.

When a touch is applied to one of graphic objects indicating the plurality of categories, respectively, the controller 180 may output information included in a category indicated by the one graphic object on the display unit 151. For example, as illustrated in the first drawing of FIG. 7A, the controller 180 may detect a touch applied to the graphic object 710 indicating one category, of the graphic objects 700, 710, and 720 indicating the plurality of categories, respectively.

When the information included in the one category is in plurality, the controller 180 may output items corresponding to the plurality of information, respectively, on the display unit 151. For example, as illustrated in a second drawing of FIG. 7A, when two mails are included in the one category indicated by the graphic object 710, items 730a and 730b corresponding to the two mails, respectively, may be output on the display unit 151.

When one information belongs to the one category, the controller 180 may output details of the information belonging to the one category on the display unit 151.

For example, as illustrated in a first drawing of FIG. 7B, the controller 180 may detect a touch applied to the graphic object 720 indicating the one category. As illustrated in a second drawing of FIG. 7B, when one mail belongs to the category indicated by the graphic object 720 to which the touch has been applied, the controller 180 may output details 740 of the mail on the display unit 151.

The foregoing description has been given of a method of outputting information belonging to categories using graphic objects indicating the categories. This may allow the user to selectively view only information belonging to a desired category.

Figure 8A:
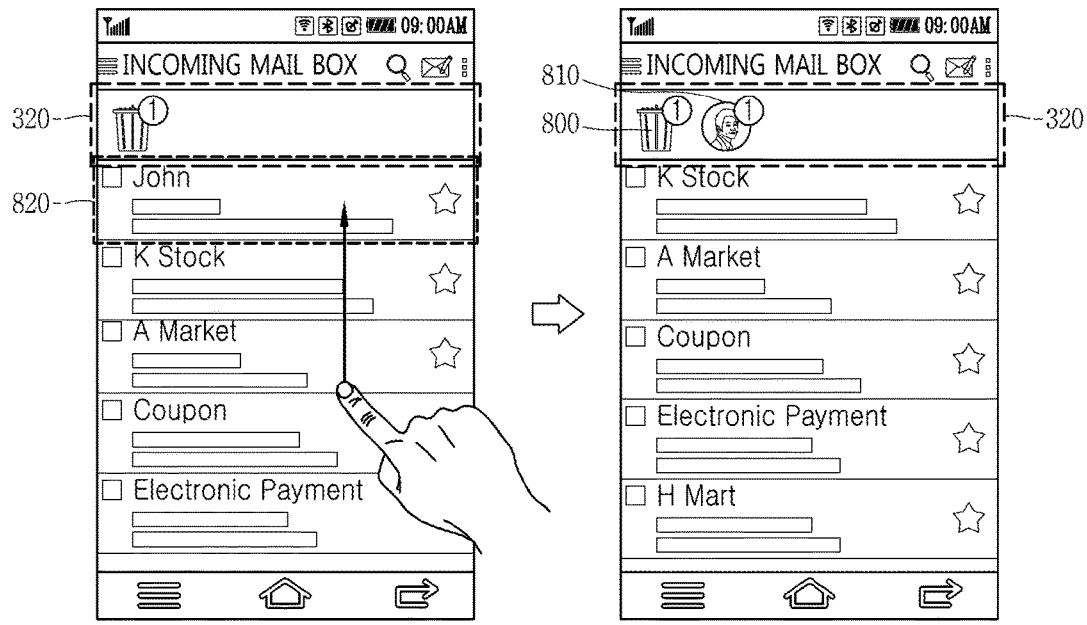
FIGS. 8A to 8C are conceptual views illustrating a method of setting target information to be categorized into a category, during an execution of a categorization scroll function.
Figure 8B:
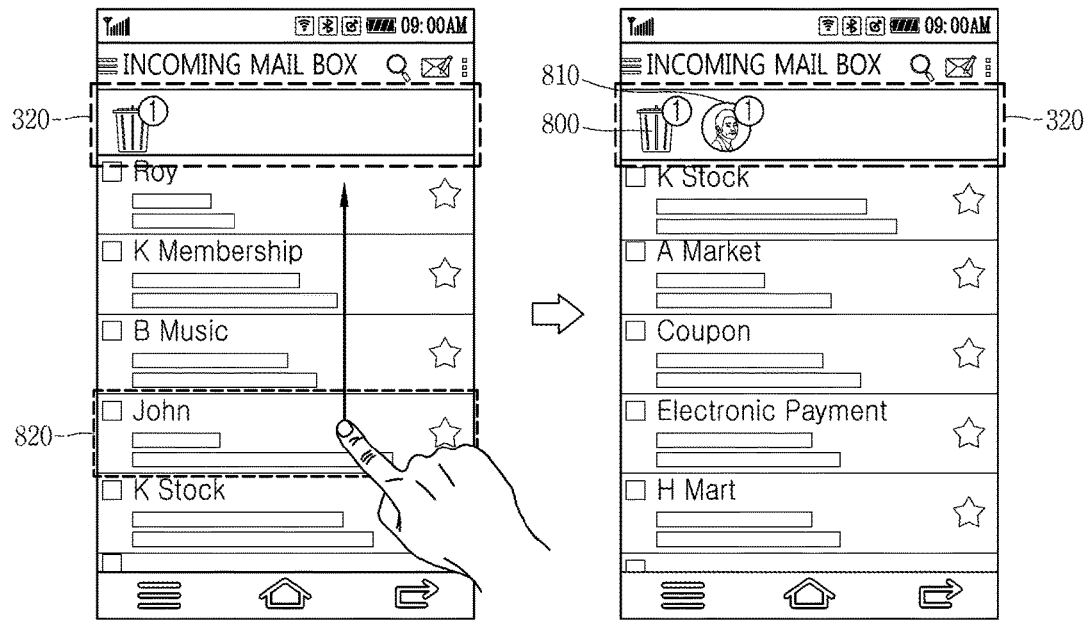
Figure 8C:
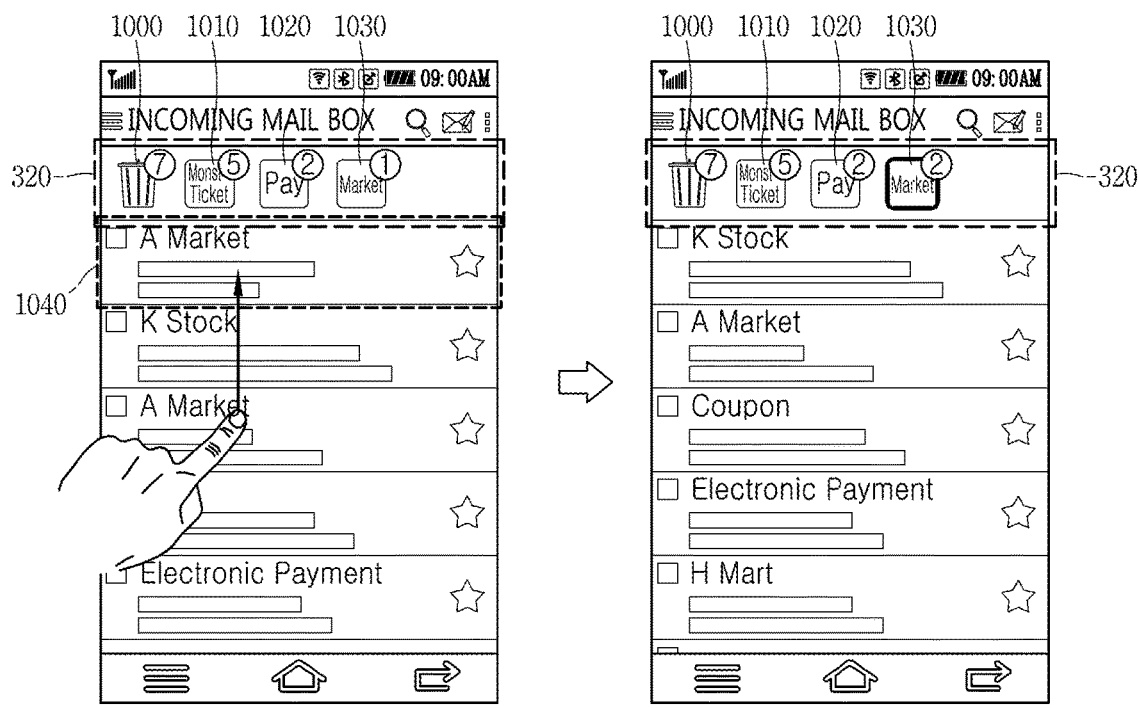

Hereinafter, description will be given of a method of setting target information to be categorized into a category. FIGS. 8A to 8C are conceptual views illustrating a method of setting target information to be categorized into a category, during an execution of a categorization scroll function.

The controller 180 may set information, which has disappeared from the display unit 151 due to being scrolled, of partial information output on the display unit 151, as target information to be categorized into a category, or set information selected by the user as the target information to be categorized into a category.

For example, as illustrated in a first drawing of FIG. 8A, the controller 180 may set information 820, which has disappeared from the display unit 151 due to being scrolled, as target information to be categorized into a category. In this instance, as illustrated in a second drawing of FIG. 8A, the controller 180 may categorize the information 820 disappeared from the display unit 151 into a specific category, and output a graphic object 810 indicating the categorized specific category on the category area 320.

As another example, as illustrated in a first drawing of FIG. 8B, when a preset touch is applied to an area, on which specific information 830 is output, of at least one information output on the display unit 151, the controller 180 may set the specific information 830 as target information to be categorized into a category. The preset touch may be a long touch.

In this instance, as illustrated in a second drawing of FIG. 8B, the controller 180 may categorize only the specific information 830 into a specific category, in response to a drag input applied, and output the graphic object 810 indicating the specific category on the category area 320. Here, the controller 180 may not execute the categorization for other scrolled information except for the specific information 830.

The controller 180 may also output the target information to be categorized into the specific category in a manner of being visually distinguished from the other information. In more detail, the controller 180 may change a color of target information to be categorized into a specific category, or output a guide image on an area where the target information to be categorized into the specific category is output. For example, as illustrated in a first drawing of FIG. 8C, the controller 180 may output a guide image, which is indicated by a dotted line, on an area where a mail 1040 to be categorized into a specific category is output.

When target information is categorized into a specific category, the controller 180 may also output a graphic object indicating the specific category in a manner of being visually distinguished from the other graphic objects indicating different categories. For example, as illustrated in a second drawing of FIG. 8C, the controller 180 may output a graphic object 1030 indicating a specific category in which the target information is categorized to be visually distinguished from the other graphic objects 1000, 1010 and 1020. Therefore, the user can intuitively recognize the category to which the target information belongs.

Although not illustrated, target information to be categorized into a specific category may be information, which has not been checked or read by the user, among several pieces of information disappeared from the display unit 151 due to being scrolled.

Although not illustrated, when there is information with notification information related to an event generated therein, among pieces of information categorized into a specific category, the controller 180 may output a graphic object corresponding to the specific category by changing a visual appearance of the graphic object.

That is, the controller 180 may change a color, shape, size or the like of a graphic object indicating a specific category to facilitate the user to recognize that notification information related to an event has been generated in one of the pieces of information belonging to the specific category.

The event may be a matter associated with details of information, for example, a matter associated with a due date included in the details of the information. For example, the event may be a matter that a coupon expiration date included in details of a mail is today. In this instance, the controller 180 may change a visual appearance of a graphic object indicating a category to which the information belongs. For example, the controller 180 may increase a size of the graphic object indicating the category including the information to be greater than that of the graphic object before the event is generated.

When there is information in which event notification information generated therein, of pieces of information categorized into a specific category, the controller 180 may output an indicator (or a badge) indicating the generation of the event or a number of times of the event generation on an area adjacent to a graphic object indicating the category including the information.

For example, when there is information from which event notification information has been generated two times, the controller 180 may output an indicator with a number 2 on one area of a graphic object indicating a category including the information.

Therefore, the user can recognize the event generation, even without directly checking the information categorized into the specific category. In addition, the user can intuitively recognize a number of times of the event generation.

The foregoing description has been given of a method of setting target information to be categorized into a category. This may allow the user to intuitively recognize the target information to be categorized into the category, during execution of a scroll function. Also, the user can directly select target information to be categorized into a category during execution of a scroll function.

Figure 9A:
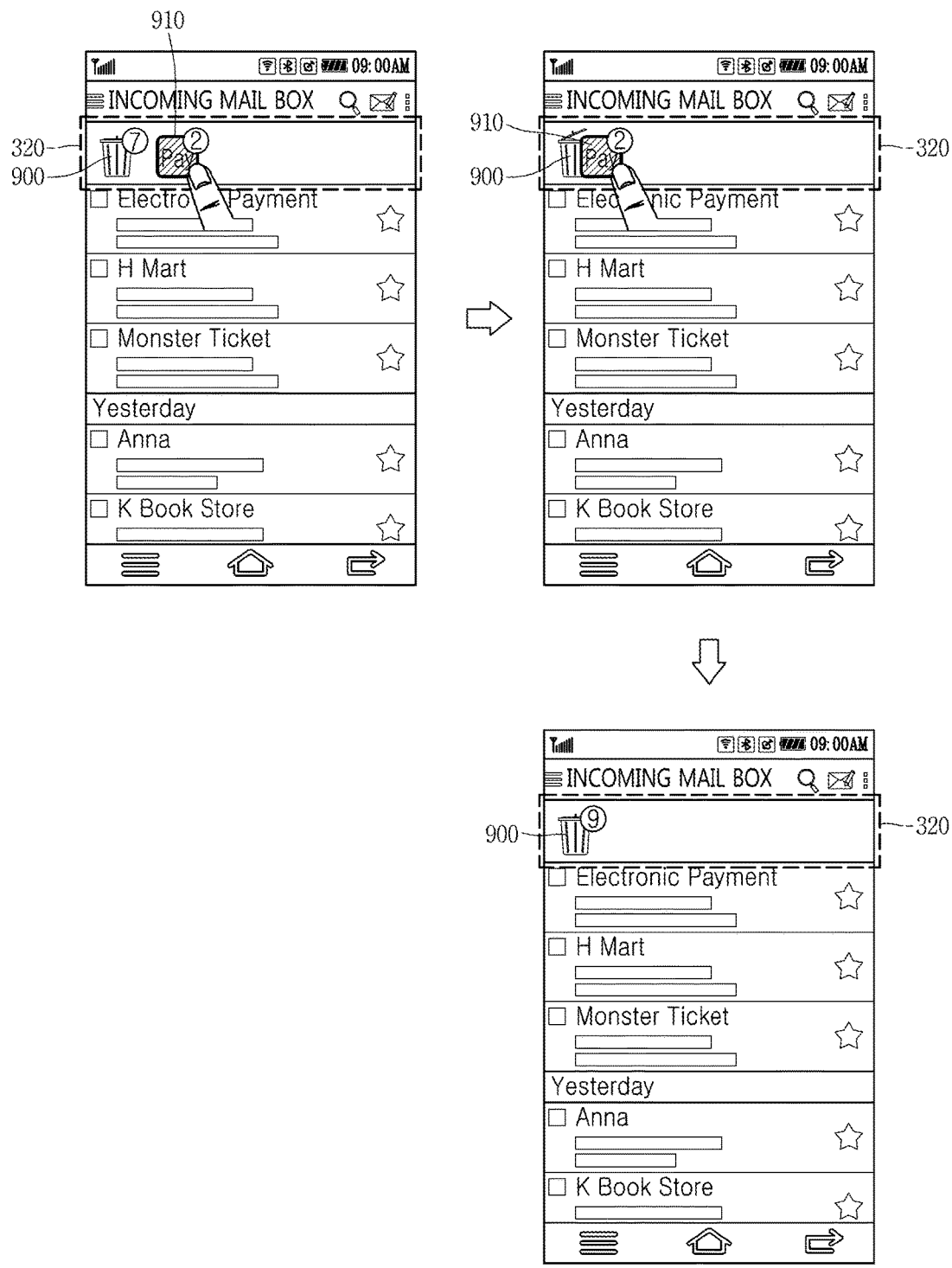
FIGS. 9A to 9C are conceptual views illustrating a method of deleting information using a graphic object indicating a category.
Figure 9B:
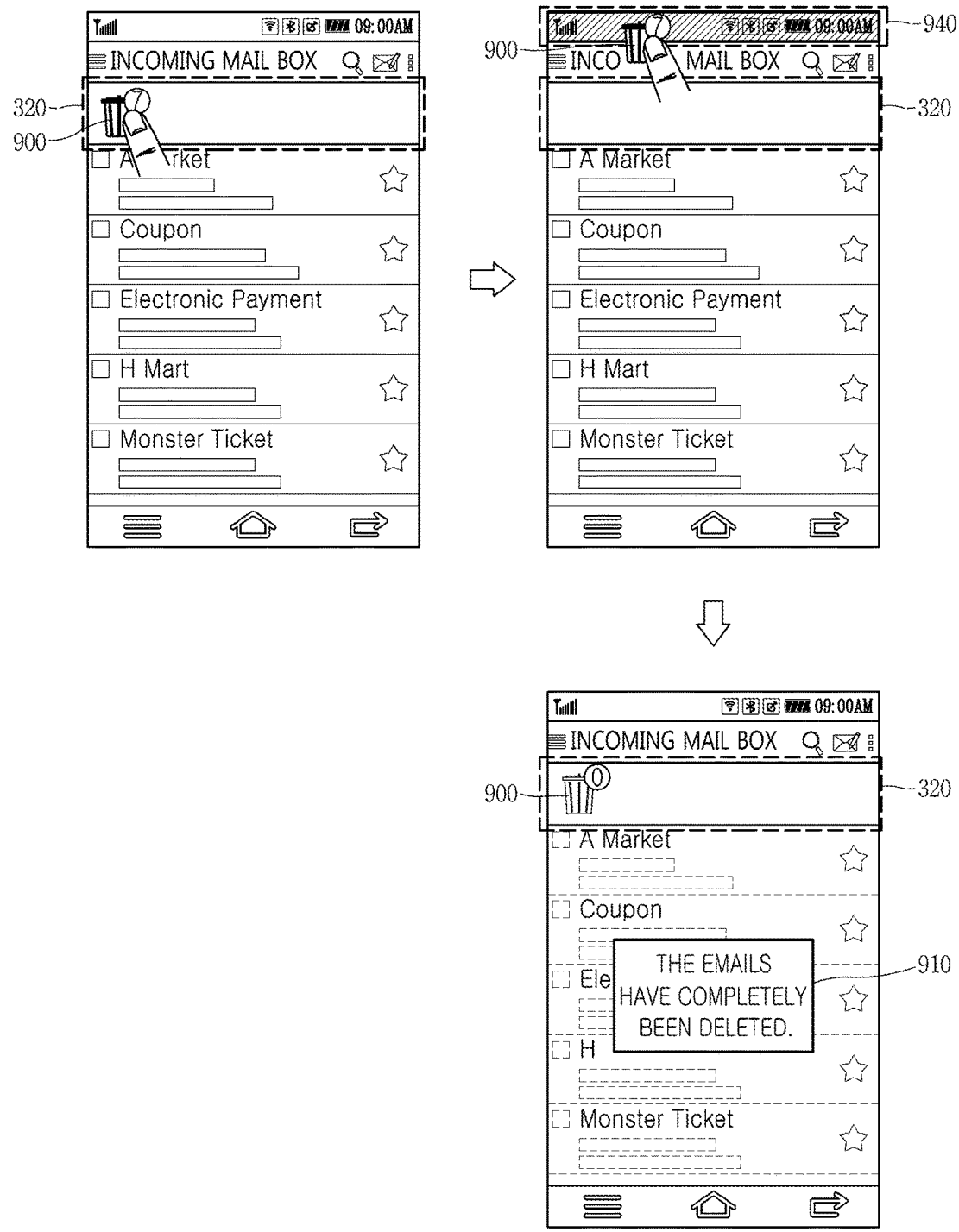
Figure 9C:
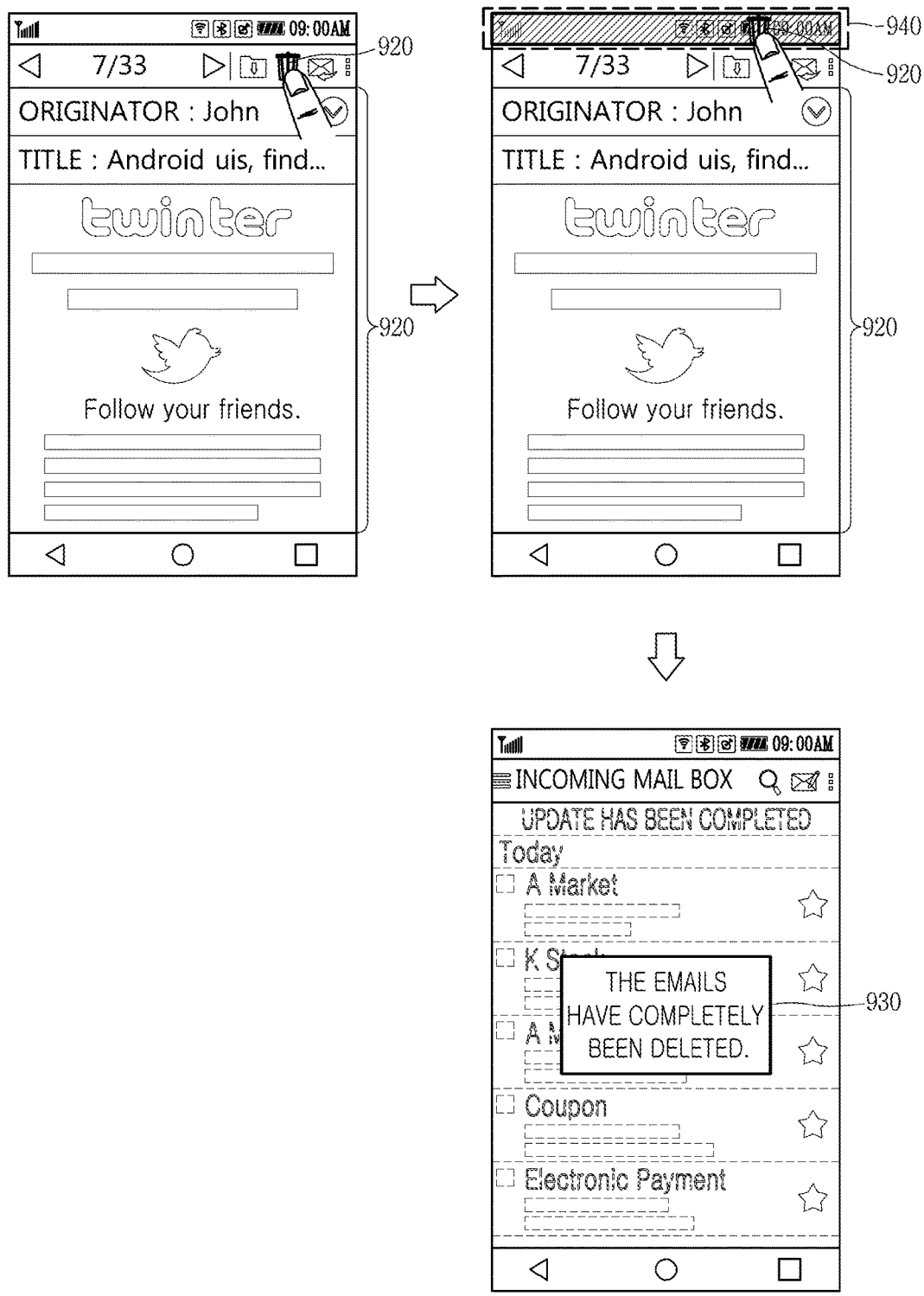

Hereinafter, description will be given of a method of deleting information using a graphic object indicating a category. FIGS. 9A to 9C are conceptual views illustrating a method of deleting information using a graphic object indicating a category.

The controller 180 may categorize a plurality of information into a plurality of categories by the categorization scroll function. In this instance, the controller 180 may delete information categorized into a delete category by using a graphic object indicating the delete category. Here, the deletion may refer to an operation of the mobile terminal of deleting information from a memory of the mobile terminal or a storage medium of an external server, such that the information cannot be recovered.

For example, as illustrated in a first drawing of FIG. 9A, the controller 180 may output on the category area 320 a graphic object 900 indicating a delete category, and a graphic object 910 indicating a specific category.

In this instance, as illustrated in a second drawing of FIG. 9A, when the graphic object 910 indicating the specific category is moved to the graphic object 900 indicating the delete category, the controller 180 may move mails belonging to the specific category into the delete category.

In this instance, as illustrated in a third drawing of FIG. 9A, in a state that seven mails are included in the delete category, when two mails belong to the specific category, nine mails may belong to the delete category. When the specific category is moved into the delete category, the mails belonging to the specific category may be set as target mails to be deleted.

This may allow the user to set all the information included in a category as target information to be deleted at once.

The controller 180 may delete information stored in the memory of the mobile terminal or a storage medium of an external server, in response to a reception of a delete request for the mails set as the target mails to be deleted. The delete request may be input by moving the graphic object indicating the delete category to a specific area.

For example, as illustrated in first and second drawings of FIG. 9B, the controller 180 may delete information belonging to the delete category, in response to a movement of the graphic object 900 indicating the delete category to a status display area 940. Here, the status display area 940 may be a preset area on the display unit 151, and may refer to an area for outputting information related to a status of the mobile terminal (e.g., a battery level, a current time, etc.).

Accordingly, the user can conveniently delete target information to be deleted, without executing many processes. When the target information to be deleted is deleted, the user cannot execute a recovery of the deleted information.

As illustrated in a third drawing of FIG. 9B, when the information belonging to the delete category is deleted, the display unit 151 may output thereon notification information 910 "Emails have completely been deleted."

Meanwhile, the controller 180 may delete information output on the display unit 151 using a graphic object linked to a delete function, without using a graphic object indicating a category.

For example, as illustrated in first and second drawings of FIG. 9C, while a detail view screen 920 of a mail is output on the display unit 151, the controller 180 may move a graphic object 920 linked to a delete function of the mail to the status display area 940. In this instance, the mail may not be set as a target mail to be deleted, but be deleted from the memory of the mobile terminal or the storage medium of the external server in an unrecoverable manner.

As illustrated in a third drawing of FIG. 9C, when the mail is deleted, the display unit 151 may output thereon notification information 930 "The email has completely been deleted."

So far, a control method of deleting information belonging to a category has been described. Therefore, the user can execute a deletion of information in an unrecoverable manner by one control command, without executing several processes.

Figure 10A:
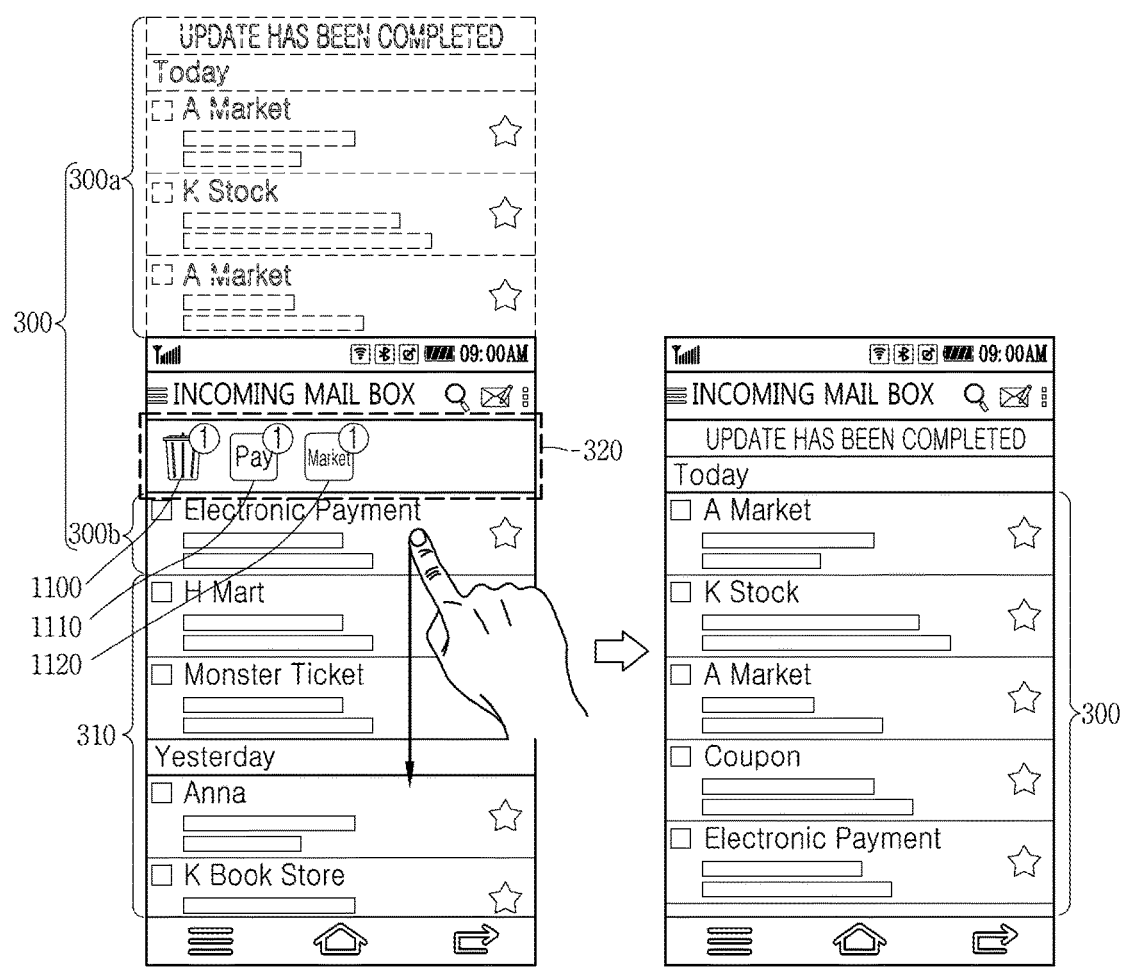
FIGS. 10A to 10C are conceptual views illustrating a method of releasing a categorization of (or decategorizing) pieces of information, which have been categorized into a plurality of categories.
Figure 10B:
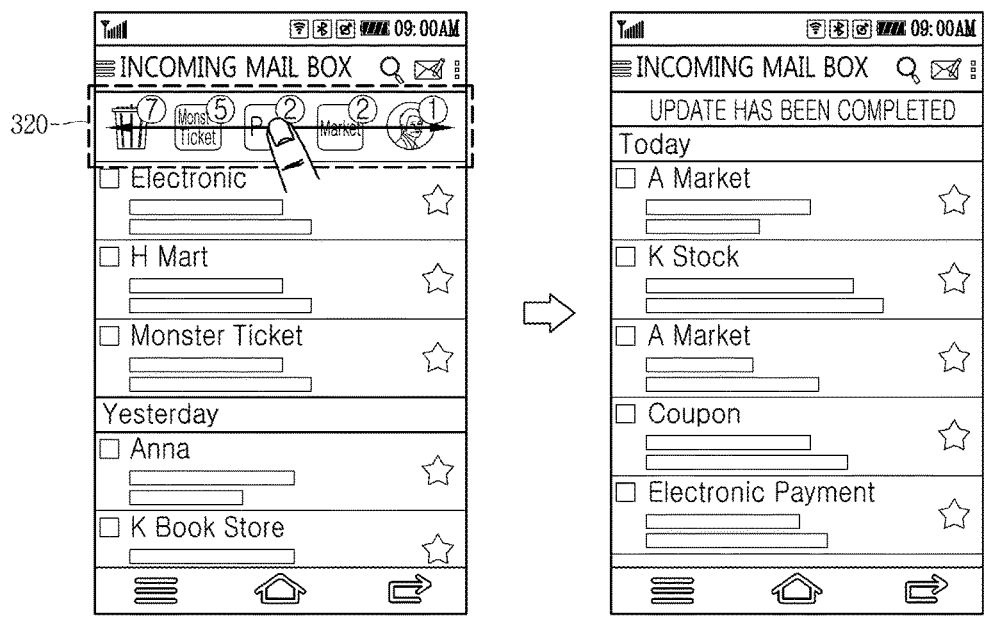
Figure 10C:
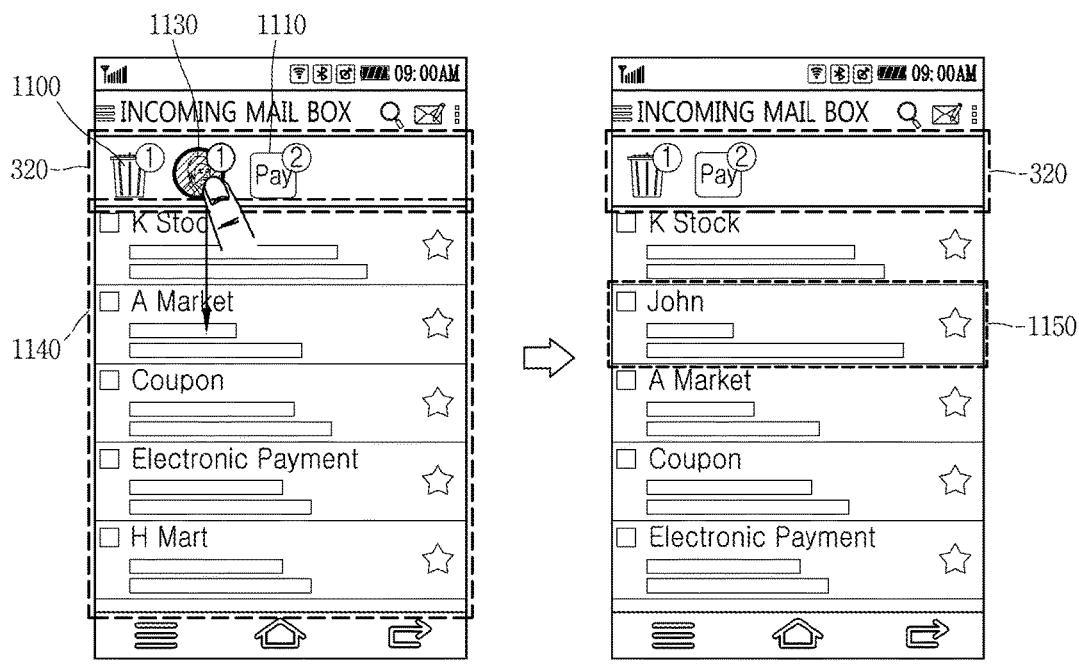

Hereinafter, description will be given of a method of releasing categorization of (or decategorizing) information categorized into a plurality of categories. FIGS. 10A to 10C are conceptual views illustrating a method of decategorizing pieces of information, which are categorized into a plurality of categories.

In a categorized state of information into a plurality of categories, when a user's control command for decategorization is applied, the controller 180 may decategorize the categorized information.

The user's control command for the decategorization may be a drag input which is applied in a direction opposite to a drag input for categorization. For example, when at least one information output on the display unit 151 is categorized in response to a drag input applied in a first direction of dragging the at least one information from down to up, the controller 180 may decategorize the categorized information in response to a drag input applied in a second direction from up to down.

As illustrated in a first drawing of FIG. 10A, after pieces of information 300a disappeared from the display unit 151 due to being scrolled are categorized into three categories, the controller 180 may detect a drag input applied from up to down.

In this instance, as illustrated in a second drawing of FIG. 10A, the controller 180 may output the information 300a disappeared from the display unit 151 due to being scrolled back on the display unit 151, and decategorize the information 300a disappeared from the display unit 151 due to being scrolled. Simultaneously, the controller 180 may control graphic objects 1100, 1110 and 1120 corresponding to the three categories, respectively, to disappear from the display unit 151.

Meanwhile, target information to be decategorized may be information re-output on the display unit 151 by being scrolled. For example, as illustrated in FIG. 10A, the information 300a disappeared from the display unit 151 may be the target information to be decategorized. As another example, although not illustrated, when only a part of the information 300a disappeared from the display unit 151 is output on the display unit 151, only the part of the information may be set as the target information to be decategorized and the others may be maintained in the categorized state. This may allow the user to set target information to be decategorized by adjusting an amount of information scrolled.

Or, the controller 180 may carry out the decategorization, in response to a preset touch applied to the category area 320. The preset touch may be a drag touch, a flicking touch, a multi touch, a double touch, a bidirectional drag touch, and the like.

For example, as illustrated in a first drawing of FIG. 10B, the controller 180 may decategorize information when a bidirectional drag touch that moves left to right is applied to the category area 320. In this instance, as illustrated in a second drawing of FIG. 10B, the controller 180 may control the category area 320 to disappear from the display unit 151. Also, the controller 180 may control the display unit 151 to output the decategorized information again. Upon completion of the decategorization, every information may be decategorized.

Or, the controller 180 may decategorize information for each category, by using a graphic object indicating the category. For example, as illustrated in a first drawing of FIG. 10C, the controller 180 may move a graphic object 1130 indicating a specific category to an area 1140 on which an item corresponding to at least one mail is output.

When the graphic object 1130 indicating the specific category is moved, the categorization of information 1150 belonging to the specific category may be released. In this instance, as illustrated in a second drawing of FIG. 10C, the display unit 151 may output thereon the information 1150 belonging to the specific category.

So far, a decategorization method has been described. This may allow the user to be provided with information categorized into categories on the display unit 151 again.

Figure 11A:
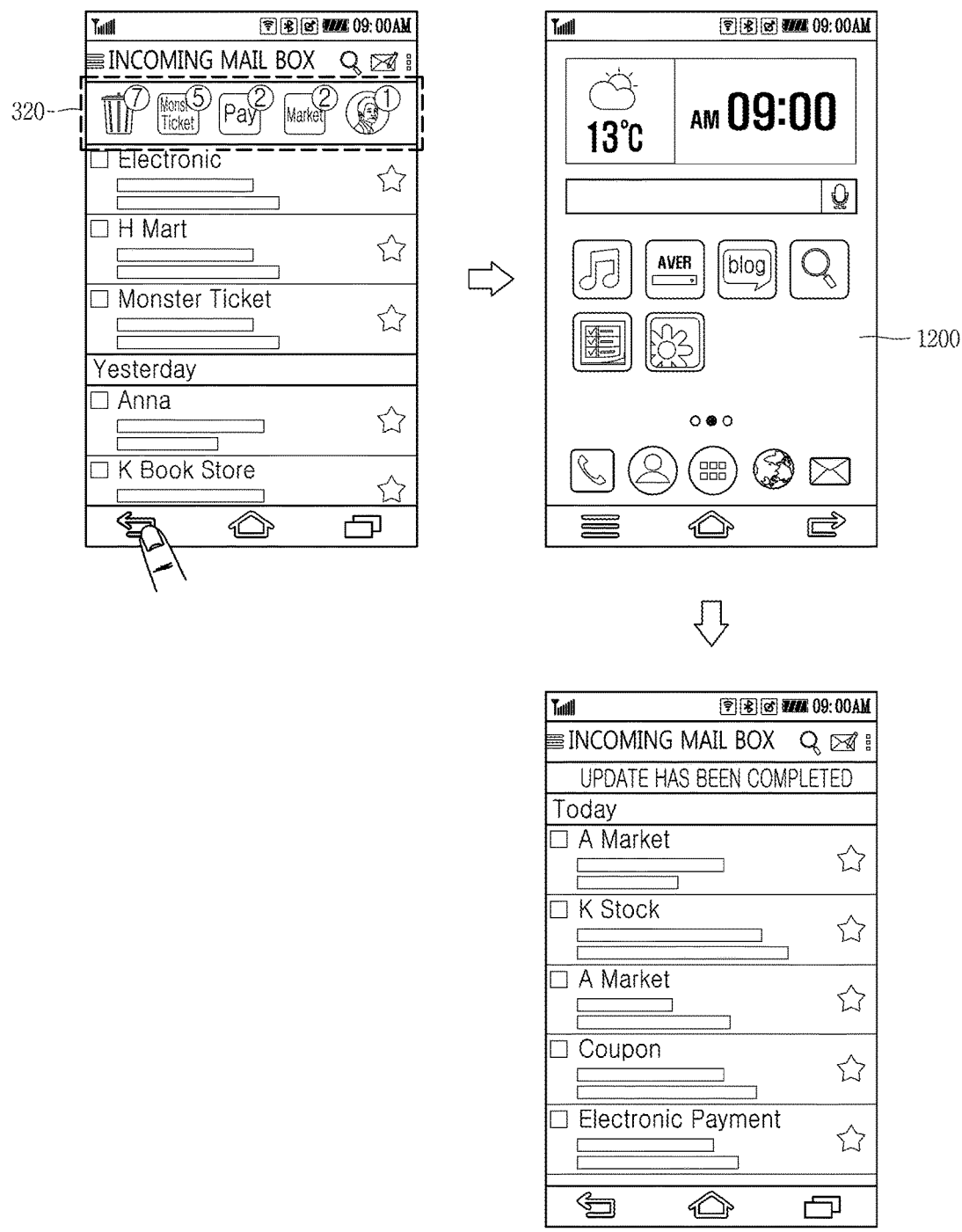
FIGS. 11A and 11B are conceptual views illustrating a case of maintaining or releasing a categorized state.
Figure 11B:
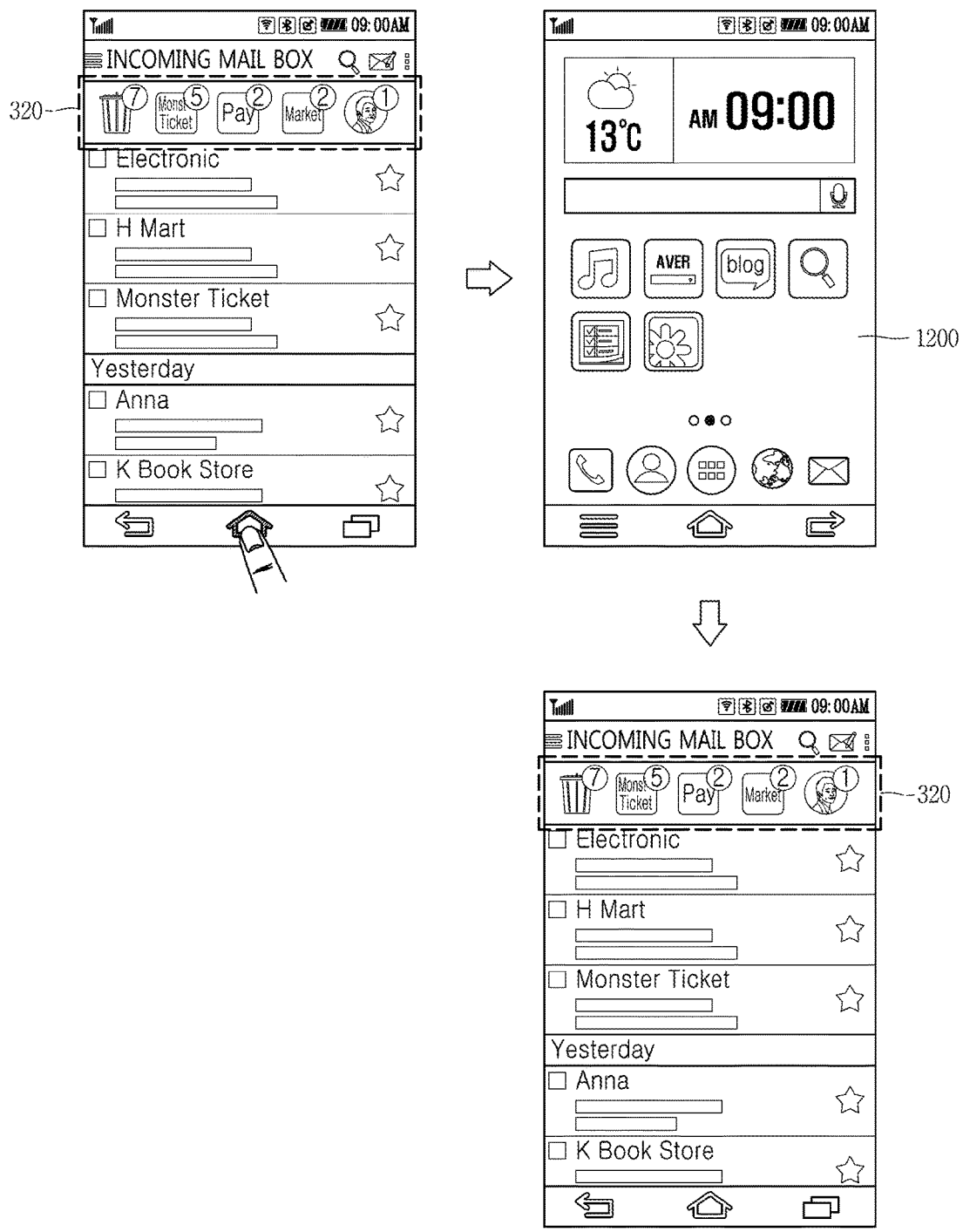

Hereinafter, description will be given of maintaining or releasing a categorized state. FIGS. 11A and 11B are conceptual views illustrating a case of maintaining or releasing a categorized state.

While the categorization scroll function is carried out on the specific application, when the specific application is terminated and then executed again, the controller 180 may decategorize categorized information.

For example, as illustrated in a first drawing of FIG. 11A, the controller 180 may receive an execution stop request of a specific application in a state that pieces of information have been categorized into a plurality of categories by the categorization scroll function during execution of the specific application. Here, the execution stop request may be a user's control command applied to a back key.

In this instance, as illustrated in a second drawing of FIG. 11A, an idle screen 1200 indicating an idle state may be output on the display unit 151.

Meanwhile, as illustrated in a third drawing of FIG. 11A, the controller 180 may re-execute the specific application, in response to a user's request applied to re-execute the specific application. In this instance, the controller 180 may decategorize the pieces of information which have been categorized in the plurality of categories before the executed specific application is terminated (stopped). Therefore, the user should carry out the categorization by performing the categorization scroll function again.

Unlike this, the controller 180 may maintain a categorized state of information when a specific application is re-executed after terminated, while the categorization scroll function is carried out on the specific application.

For example, as illustrated in a first drawing of FIG. 11B, the controller 180 may receive an execution stop request of a specific application in a state that pieces of information have been categorized into a plurality of categories by the categorization scroll function during execution of the specific application. Here, the execution stop request may be a user's request for entering an idle screen. In this instance, as illustrated in a second drawing of FIG. 11B, an idle screen 1200 indicating an idle state may be output on the display unit 151.

On the other hand, as illustrated in a third drawing of FIG. 11B, the controller 180 may re-execute the stopped specific application, in response to a user request for re-executing the specific application. In this instance, the controller 180 may maintain the state of the pieces of information which have been categorized into the plurality of categories before the executed specific application is stopped. This may allow the user to be provided with the information in the categorized state even after executing a multitasking function.

So far, a case of maintaining or releasing a categorized state of information has been described.

Figure 12A:
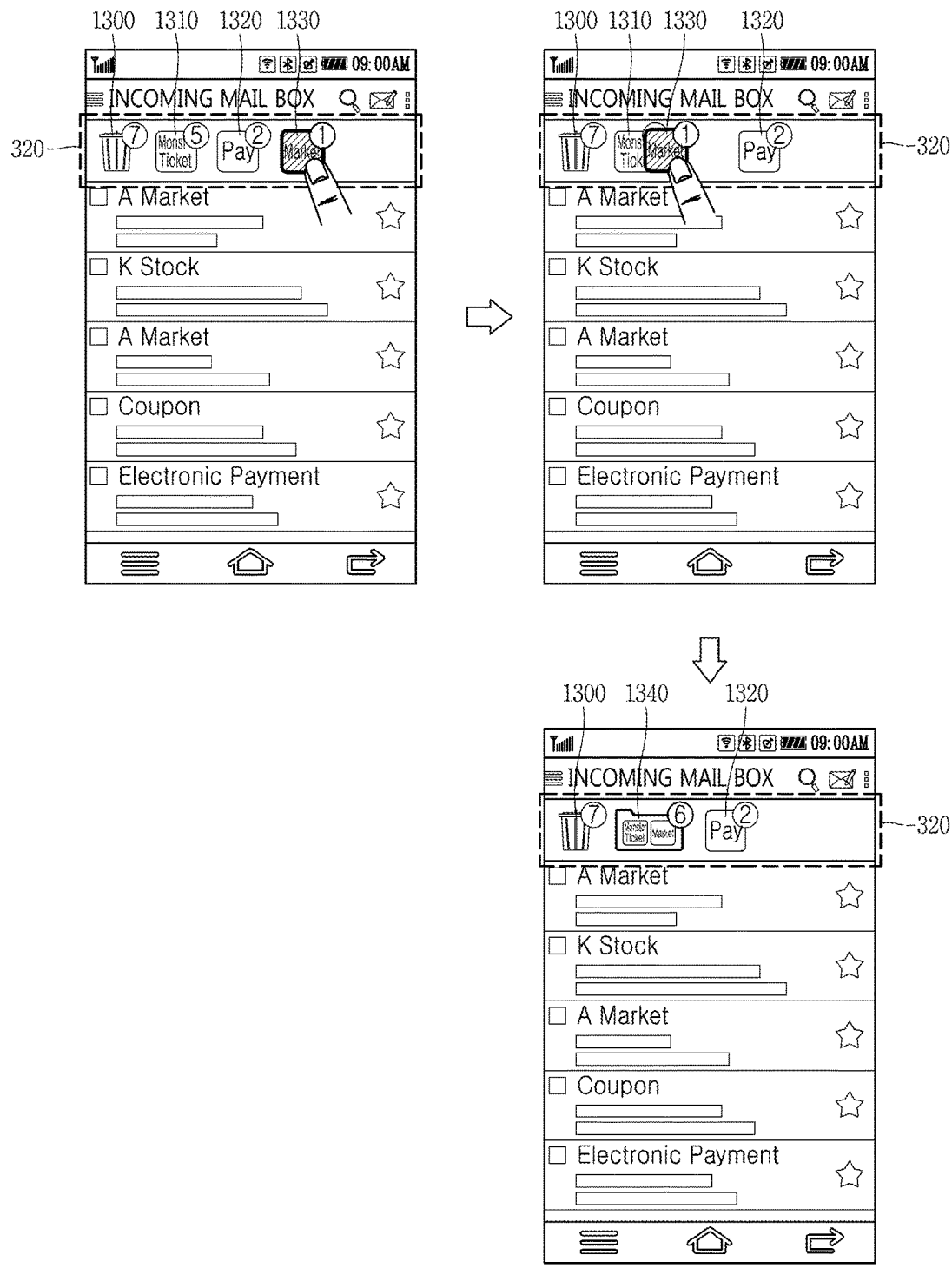
FIGS. 12A and 12B are conceptual views illustrating a method of performing a category-related control through interaction between graphic objects indicating categories, respectively.
Figure 12B:
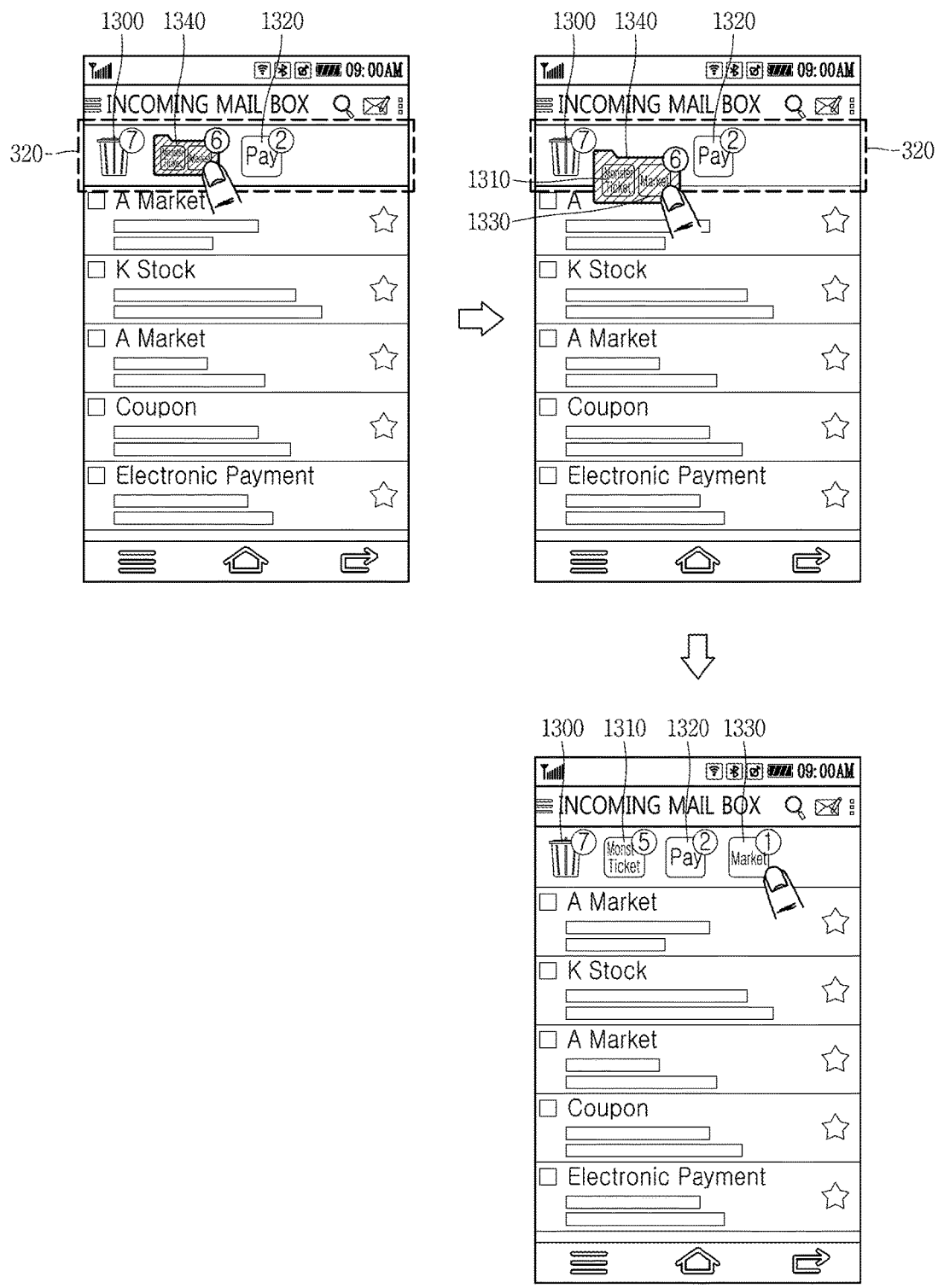

Hereinafter, description will be given of a method of performing a control associated with categories through interaction between graphic objects indicating the categories. FIGS. 12A and 12B are conceptual views illustrating a method of performing a category-related control through interaction between graphic objects indicating categories.

The controller 180 may categorize information into a plurality of categories based on a preset condition by use of the categorization scroll function. Also, the controller 180 may output graphic objects 1300, 1310, 1320 and 1330 corresponding to the plurality of categories, respectively, on the category area 320.

The controller 180 may execute a control associated with the categories, using the graphic objects 1300, 1310, 1320 and 1330 corresponding to the plurality of categories, respectively. The control associated with the categories may include a movement between categories, a deletion of a category, category merging, and a release of merged categories.

For example, as illustrated in first and second drawings of FIG. 12A, the controller 180 may move one graphic object 1330 of the graphic objects 1300, 1310, 1320 and 1330 corresponding to the plurality of categories, respectively, to another graphic object 1310. In this instance, as illustrated in a third drawing of FIG. 12A, the controller 180 may merge a category indicated by the graphic object 1330 with a category indicated by the another graphic object 1310 to generate one category, and output a graphic object 1340 indicating the newly-generated category on the category area 320. Simultaneously, the one graphic object 1330 and the another graphic object 1310 may disappear from the display unit 151.

On the other hand, as illustrated in FIG. 12B, when a touch is applied to the another graphic object 1330 on the graphic object 1340 indicating the generated category, the controller 180 may release the merged category indicated by the another graphic object 1330. In this instance, the one graphic object 1330 and the another graphic object 1310 may be output on the display unit 151 again.

In this instance, the controller 180 may delete the generated one category. So far, a method of performing a control associated with categories through the interaction between graphic objects indicating the categories has been described.

Figure 13:
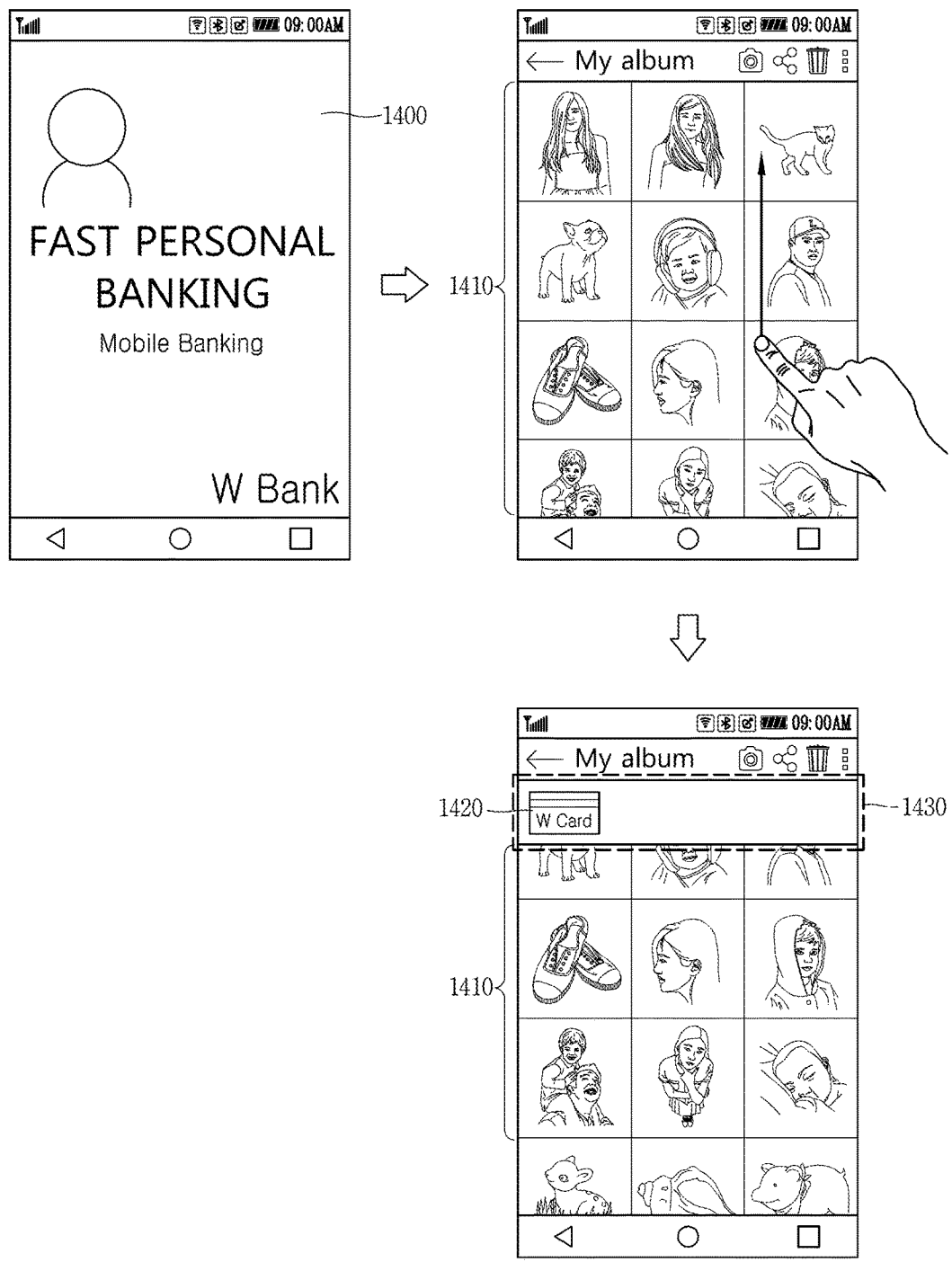
FIG. 13 is a conceptual view illustrating a method of performing categorization, based on related information between currently-executed applications.

Hereinafter, description will be given of a method of executing categorization into categories, based on information between currently-executed applications. FIG. 13 is a conceptual view illustrating a method of performing categorization into categories, based on related information between currently-executed applications.

When at least two applications are simultaneously executed, the controller 180 may detect specific information useable on another application from a plurality of information of one application, and categorize the specific information into a category.

The controller 180 may thus allow the user to recognize that the specific information can be used on the another application. Also, the user can easily use the specific information on the another application, even without a separate search for the specific information.

For example, as illustrated in a first drawing of FIG. 13, a bank application 1400 may be executed. In this instance, as illustrated in a second drawing of FIG. 13, when a gallery application is executed during execution of the bank application 1400, the controller 180 may detect specific information 1420, which can be used on the bank application 1400, from a plurality of information 1410 provided from the gallery application. The specific application 1420 may be a security card image.

In this instance, as illustrated in a third drawing of FIG. 13, the controller 180 may output the security card image in a category area 1430 on an execution screen of the gallery application.

Therefore, the user can immediately recognize the relationship between currently-executed two applications, and carry out various functions using the two applications in a convenient manner.

The present invention may allow for scrolling screen information and simultaneously categorizing information disappeared from the display unit due to being scrolled. This may result in providing brief information related to information invisible on the display unit, and also conveniently controlling non-output information on the display unit through a user's control command for the brief information.

Also, the present invention may provide a user interface of conveniently deleting information disappeared from the display unit due to being scrolled when screen information is scrolled, thereby checking the screen information in the scrolling manner and simultaneously deleting information determined as unnecessary.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a method of effectively providing a large amount of information.

Another aspect of the detailed description is to provide a method of deleting unnecessary information of a large amount of information at once in a manner of automatically categorizing the unnecessary information, even without a separate control command.

To achieve these and other advantages and in accordance with the purpose of this specification, as embodied and broadly described herein, there is provided a mobile terminal including a display unit capable of outputting partial information of a plurality of information, and a controller capable of scrolling the partial information, in response to a user's control command. Here, the controller may categorize at least one of the partial information into a specific category according to a preset condition when the at least one information disappears from the display unit due to being scrolled, and output a graphic object corresponding to the categorized specific category.

In one exemplary embodiment disclosed herein, the specific category may be a delete category for deleting information. The controller may set the at least one information as target information to be deleted when the at least one information is categorized into the delete category. The controller may delete the at least one information from a memory, in response to a touch applied to an output area of a graphic object corresponding to the delete category.

In one exemplary embodiment disclosed herein, the display unit may be divided into a plurality of areas, and the controller may categorize the at least one information as the target information to be deleted, in response to a drag input applied to a specific area of the plurality of areas.

In one exemplary embodiment disclosed herein, the display unit may be divided into a plurality of areas. The controller may execute a first function of categorizing the at least one information into a specific category while scrolling the at least one information, in response to a touch input applied to a first area of the plurality of areas. The controller may execute a second function of scrolling the at least one information, in response to a touch input applied to a second area of the plurality of areas.

In one exemplary embodiment disclosed herein, when the partial information is scrolled, the controller may output target information to be categorized into a specific category, of the partial information, in a manner of being visually distinguished from the other information.

In one exemplary embodiment disclosed herein, the controller may categorize only unchecked information into a specific category, of the partial information disappeared from the display unit due to being scrolled.

In one exemplary embodiment disclosed herein, the controller may change a visual appearance of the graphic object corresponding to the specific category when there is information, from which notification information related to an event is generated, among the information categorized into the specific category.

In one exemplary embodiment disclosed herein, the controller may output graphic objects corresponding a plurality of categories, respectively, on the display unit when the at least one information is categorized into the plurality of categories according to a preset condition.

In one exemplary embodiment disclosed herein, the controller may output information included in a specific category corresponding to a specific graphic object on the display unit, in response to a touch applied to the specific graphic object of the graphic objects corresponding to the plurality of categories, respectively.

In one exemplary embodiment disclosed herein, the controller may move one of the graphic objects corresponding to the plurality of categories, respectively, to an output area of the partial information, in response to a drag input applied to the one graphic object. The controller may decategorize information categorized into a category corresponding to the one graphic object when the drag input is released after the one graphic object is moved to the output area of the partial information.

In one exemplary embodiment disclosed herein, the controller may categorize the at least one information into a specific category, in response to a drag input applied in a first direction to an output area of the partial information, and decategorize the at least one information categorized into the specific category, in response to a drag input applied in a second direction to the output area of the partial information. Here, the second direction may be opposite to the first direction.

In one exemplary embodiment disclosed herein, the controller may decategorize the information categorized into the specific category, in response to a preset touch applied to an output area of the graphic object corresponding to the specific category.

In one exemplary embodiment disclosed herein, the decategorized information may be output on the display unit again.

In one exemplary embodiment disclosed herein, the controller may control the graphic object corresponding to the specific category to disappear from the display unit when the information categorized into the specific category is decategorized.

In one exemplary embodiment disclosed herein, the preset condition may be a condition associated with at least one of details of information, identification information included in the information, and importance of the information.

A mobile terminal in accordance with another exemplary embodiment disclosed herein may include a display unit capable of outputting partial information of a plurality of information, and a controller capable of scrolling the partial information of the plurality of information, in response to a user's control command. Here, the controller may set at least one of the partial information disappeared from the display unit when the at least one information disappear from the display unit due to being scrolled, and output a graphic object indicating a delete category on the display unit such that the at least one information is deleted based on a user's control command.

In one exemplary embodiment disclosed herein, the controller may delete the at least one information from a memory, in response to a touch applied to the graphic object indicating the delete category.

A mobile terminal in accordance with another exemplary embodiment disclosed herein may include a display unit capable of outputting partial information of a plurality of information, and a controller capable of categorizing at least one of the partial information into a specific category based on a preset condition as the partial information is scrolled, in response to a user's control command, and outputting a graphic object corresponding to the specific category on the display unit. Here, the at least one information categorized into the specific category may correspond to information disappeared from the display unit due to being scrolled, among of the partial information.

In one exemplary embodiment disclosed herein, the controller may set only unchecked information, of the at least one information disappeared from the display unit, as target information to be deleted.

In one exemplary embodiment disclosed herein, the controller may decategorize the information categorized into the specific category when the at least one information disappeared from the display unit is output again on the display unit, in response to a user's control command.

To achieve these and other advantages and in accordance with the purpose of this specification, as embodied and broadly described herein, there is provided a method for controlling a mobile terminal, the method including outputting partial information of a plurality of information, scrolling the partial information in response to a user's control command, categorizing at least one of the partial information into a specific category according to a preset condition when the at least one of the partial information disappears from the display unit due to being scrolled, and outputting a graphic object corresponding to the categorized specific category. Here, the categorizing into the specific category may be executed to decategorize the information categorized into the specific category when the at least one information is output again on the display unit in response to a user's additional control command.

In one exemplary embodiment disclosed herein, the specific category may be a delete category for deleting information, and the categorizing into the specific category may include setting the at least one information as target information to be deleted when the at least one information is categorized into the delete category, and deleting the at least one information from a memory, in response to a touch applied to an output area of a graphic object corresponding to the delete category.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a memory;
a display that displays partial information of a plurality of information; and
a controller that:
controls the display to scroll the partial information on the display in response to a control command,
categorizes at least one of the partial information as corresponding to a specific category according to a preset condition when the at least one partial information is removed from the display based on the scroll of the partial information,
categorizes at least one of the partial information as corresponding to a delete category that do not satisfy the preset condition when the at least one partial information is removed from the display based on the scroll of the partial information,
controls the display to output graphic objects corresponding to each of the specific category and the delete category, on a predetermined region of the display,
controls the display to output a first number of information pieces belonging to the specific category and to output a second number of information pieces belonging to the delete category, on the predetermined region of the display,
wherein the controller sets the at least one partial information as target information to be deleted when the at least one partial information is categorized as corresponding to the delete category after the at least one partial information is removed from the display based on the scroll of the partial information, and
wherein in response to a touch input at the graphic object corresponding to the delete category, the controller deletes, from the memory, the at least one partial information corresponding to the target information.

2. The mobile terminal of claim 1, wherein the display includes a plurality of separate areas, and
wherein in response to a drag input to a first area of the plurality of separate areas, the controller categorizes the at least one partial information as the target information to be deleted.

3. The mobile terminal of claim 1, wherein the display is separated into a plurality of separate areas, and
wherein in response to a touch input at a first area of the plurality of separate areas, the controller executes a first function of categorizing the at least one partial information as corresponding to a specific category while scrolling the at least one partial information, and
wherein in response to a touch input at a second area of the plurality of separate areas, the controller executes a second function of scrolling the at least one partial information.

4. The mobile terminal of claim 1, wherein when the partial information is scrolled on the display, the controller controls the display to output target information to be categorized as corresponding to a specific category, wherein the target information output at the display is visually distinguished from other information output at the display.

5. The mobile terminal of claim 1, wherein of all the partial information that is removed from the display based on the scroll of the partial information, the controller categorizes only unchecked partial information as corresponding to a specific category.

6. The mobile terminal of claim 1, wherein the controller controls the display to output an indicator indicating a generation of an event on one area of the graphic object corresponding to the specific category, when there is information with notification information related to the generated event.

7. The mobile terminal of claim 1, wherein when a plurality of partial information are categorized as corresponding to separate ones of the plurality of categories, the controller controls the display to output a plurality of graphic objects corresponding to the plurality of categories, respectively.

8. The mobile terminal of claim 7, wherein in response to a touch input at a specific one of the graphic objects, the controller controls the display to output information included in a specific category corresponding to the specific graphic object.

9. The mobile terminal of claim 7, wherein in response to a drag input at one of the graphic objects, the controller controls the display to move one of the graphic objects to an output area of the display, and
wherein after the one graphic object is moved to the output area of the display and the drag input is released, the controller decategorizes information categorized as corresponding to a category of the one graphic object.

10. The mobile terminal of claim 1, wherein in response to a drag input in a first direction to an output area of the display, the controller categorizes the at least one partial information as corresponding to a specific category, and
wherein in response to a drag input in a second direction to the output area of the display, the controller decategorizes the at least one partial information categorized as corresponding to the specific category.

11. The mobile terminal of claim 1, wherein in response to a preset touch at the graphic object corresponding to the specific category or the graphic object corresponding to the delete category, the controller decategorizes the partial information categorized as corresponding to the specific category or the delete category.

12. The mobile terminal of claim 11, wherein the controller controls the display to output the decategorized partial information.

13. The mobile terminal of claim 11, wherein when the partial information categorized as corresponding to the specific category or the delete category is decategorized, the controller controls the display to remove the graphic object corresponding to the specific category or the graphic object corresponding to the delete category.

14. The mobile terminal of claim 1, wherein the preset condition is a condition associated with at least one of details of information, identification information included in the information, and importance of the information.

15. A mobile terminal comprising:
a memory;
a display that displays partial information of a plurality of information; and
a controller that:
controls the display to output information,
in response to a control command, categorizes at least one of the partial information as corresponding to a specific category based on a preset condition as the partial information is scrolled on the display,
categorizes at least one of the partial information as corresponding to a delete category that do not satisfy the preset condition as the partial information is scrolled on the display, controls the display to display graphic objects corresponding to each of the specific category and the delete category, on a predetermined region of the display, and controls the display to output a first number of information pieces belonging to the specific category and to output a second number of information pieces belonging to the delete category, on the predetermined region of the display, wherein the controller sets the at least one partial information as target information to be deleted when the at least one partial information is categorized as corresponding to the delete category after the at least one partial information is removed from the display based on the scroll, and wherein in response to a touch input at the graphic object corresponding to the delete category, the controller deletes, from the memory, the at least one partial information corresponding to the target information.

16. The mobile terminal of claim 15, wherein of all the partial information that is scrolled from the display, the controller categorizes only unchecked partial information.

17. The mobile terminal of claim 15, wherein the controller decategorizes the information categorized as corresponding to the specific category when the at least one partial information scrolled from the display, is displayed again on the display, in response to a control command.

18. A method for controlling a mobile terminal, the method comprising:

displaying, on a display, partial information of a plurality of information;

in response to a control command, scrolling the partial information on the display;

categorizing at least one of the partial information as corresponding to a specific category according to a preset condition when the at least one of the partial information is scrolled off the display;

categorizing the at least one of the partial information as corresponding to a delete category that do not satisfy the preset condition when the at least one of the partial information is scrolled off the display;

displaying graphic objects corresponding to each of the categorized specific category and the categorized delete category, on a predetermined region of the display, and displaying a first number of information pieces belonging to the specific category and displaying a second number of information pieces belonging to the delete category, on the predetermined region of the display, wherein the categorizing of the at least one partial information includes decategorizing the partial information categorized as corresponding to the specific category when the at least one partial information is displayed again on the display in response to an additional control command, wherein the method further comprises:

setting the at least one partial information as target information to be deleted when the at least one partial information is categorized as corresponding to the delete category after the at least one partial information is removed from the display based on the scroll, and in response to a touch input at the graphic object corresponding to the delete category, deleting, from a memory of the mobile terminal, the at least one partial information corresponding to the target information.

* * * * *